(12) United States Patent
Yamato, II et al.

(10) Patent No.: US 11,809,421 B2
(45) Date of Patent: Nov. 7, 2023

(54) SYSTEM AND METHOD FOR DATA ANALYTICS

(71) Applicants: Craig Ken Yamato, II, San Jose, CA (US); Michael Robert Jacobs, Sunnyvale, CA (US)

(72) Inventors: Craig Ken Yamato, II, San Jose, CA (US); Michael Robert Jacobs, Sunnyvale, CA (US)

(*) Notice: Subject to any disclaimer, the term of this patent is extended or adjusted under 35 U.S.C. 154(b) by 0 days.

(21) Appl. No.: 17/384,657

(22) Filed: Jul. 23, 2021

(65) Prior Publication Data

US 2022/0027361 A1   Jan. 27, 2022

Related U.S. Application Data

(60) Provisional application No. 63/055,336, filed on Jul. 23, 2020.

(51) Int. Cl.
| | |
|---|---|
| *G06F 16/00* | (2019.01) |
| *G06F 16/2453* | (2019.01) |
| *G06F 16/2455* | (2019.01) |

(52) U.S. Cl.
CPC ...... *G06F 16/2453* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 5,918,229 A | 6/1999 | Davis | |
| 7,818,313 B1 | 10/2010 | Tsimelzon | |
| 11,327,992 B1* | 5/2022 | Batsakis | H04L 63/083 |
| 2008/0005528 A1 | 1/2008 | Morris | |

* cited by examiner

*Primary Examiner* — Thu Nguyet T Le
(74) *Attorney, Agent, or Firm* — Paul J Pearah

(57) ABSTRACT

Systems and methods for storing and querying voluminous "big data" are described, with application to append-only hyperscale databases. The methods dispense with blob abstractions such as objects and file systems, instead storing data as addressable binary sequences at all stages of storage and querying. In particular, a microservices architecture system arrangement combines with a powerful data format to create an architecture for executing an external query using a distributed process.

33 Claims, 21 Drawing Sheets

SYSTEM AND METHOD FOR DATA ANALYTICS

FIELD OF THE INVENTION

The invention relates to data analytics, specifically a computer-based system and method for storing and analyzing voluminous data.

BACKGROUND

The volume of data being generated and analyzed has grown monotonically over the centuries. For example, in 1880, prior to computers, it took over seven years for the U.S. Census Bureau to process the collected information and complete a final report. The advent of a punch card tabulating machine shortened the data analytics cycle to 18 months for the following census. The volume of available meaningful data has continued to increase storage demands, and to drive and outstrip the technology for processing it, to this day.

A century after the invention of the aforementioned punch card tabulating machine, the advent of relational databases allowed for far more efficient storage and analysis of large quantities of data. More flexible non-relational databases were required in order to keep up with the emergence of the Internet and its concomitant bandwidth. Data warehouse mining and Internet searching drove further improvements. Modern data collection and telemetry systems are often scaled to accommodate data production in the trillions of records using mainframe or cloud-based data warehouses to store data, which in turn is organized into files.

At least because modern data systems have generally evolved piecemeal in response to increasing demands, the systems which have emerged are a complex ad hoc pipeline of hardware and software that fails to ingest, manipulate, analyze or store data efficiently, and often stores only an abridged or outdated dataset in a useful, accessible format and location readily available for analysis or query, thereby essentially discarding most of the data.

Historically, datasets have been stored in one or more files in memory. Unfortunately, the file formats used to date limit the efficiency of modern high-performance data analytics (HPDA) systems, for example those implemented using High Performance Compute (HPC). The data files are often stored in a generic format suitable for multiple applications. In most cases, the operating system on which the data distillation ("squish squash"), manipulation and analytics applications run provides access to the storage media and management of the file system.

Arranging data into generic, standardized file formats permits data transportability and the sharing of data storage media by multiple applications. The overhead introduced by the layers of extrapolation associated with generic file formats traditionally has been accepted as a fair tradeoff for the facilitated use of shared resources.

In recent years, a combination of low-cost computing power and storage has dovetailed with advancements in statistical models of large-scale datasets using static human developed and dynamic machine learning (ML)/artificial intelligence (AI) based algorithms. That confluence has enabled the creation of large numbers of massive data collection points, which in turn generate trillions of records.

Two methodologies have been adopted in handling and analyzing those large streams of data. The first has been to analyze the data as it is produced, keeping only the distilled knowledge. In that self-compounding methodology, previously-collected data is discarded, and impacts future collection through an adjusted map-reduce process and/or ML/AI guided data element selection. The second approach has been to capture and normalize data feeds for later analyses. In this method, an analysis performed by a human or by AI can shape sequential queries over the same data without needing to collect new data. Clearly the latter approach is limited to historical data, and can never yield current or real-time results.

The net result of both of these new paradigms in data analysis is the heavy use of the distributed dedicated computing resources and equally-scaled datasets. In addition to application complexity, demands on hardware have increased. In the past, hardware was scaled to run multiple distinct applications on a single host with shared storage. Today, while a single host may run multiple microservices, they are often all parts of a single application working in parallel to provide a single contemporaneous response.

In the context of modern "big data" systems, the interim solution described above falls short. Such systems often employ hyperscale computing to efficiently scale to multiple servers to accommodate hyperscale databases on the order of at least one terabyte (TB), which may for example comprise hyperscale databases comprising 100 TB of data, or perhaps many orders of magnitude more into the petabyte (PB) or exabyte (EB) range. Particularly in the context of hyperscale datasets comprising high velocity volumetric data (e.g. uncapped data streams of >1 Gbps and perhaps many orders of magnitude greater and at least 1 TB when at rest) the burdens associated with manipulating legacy standardized file formats, such as performance, latency, database synchronization and cost, have become onerous. Hyperscale data has exceeded the capacity of legacy systems to store and process it as an undivided whole, and in current practice most of the data stream is often discarded to keep analytics manageable and results timely. Application developers devote significant resources to configuring data pipelines to mitigate severe data loss and synchronization issues inherent in the legacy systems, rather than to more valuable data analytics.

For example, legacy "Big Data" systems often try to accommodate large hyperscale datasets in three ways. The first is to reduce the size of the dataset, or throttle the rate at which data enters the system, by sampling and reducing the data.

Sampling introduces error to the extent that a sampling frequency of 1 in every n records fails to be statistically representative of the entire group, and is only accurate to the extent that the group tends to have a predictable distribution (e.g. homogeneous, normally distributed, etc.) and the sample size is sufficient. Data reduction may employ methods such as consultation, calculation, and filtering. Both data sampling and data reduction effectively limit the ability to analyze the historical data later in the same or another fashion.

The second manner in which legacy "Big Data" systems endeavor to accommodate hyperscale datasets is to scale out a given dataset by breaking it into the more commonly used 1 (one) gigabyte (GB) file size datasets for which "Big Data" systems were designed. Using a method of sharding or splitting the data between those 1 GB files, the system can build an index of where certain data is likely to be stored, so that the system needs to search only that file when queried. The foregoing assumes the index can be found, and that the query does not span multiple files and indexes.

The third manner in which legacy "Big Data" systems strive to accommodate large hyperscale datasets is to further scale the dataset out throughout available system resources. That practice effectively creates silos of "Big Data" systems or subsystems which are controlled by an orchestration system. The orchestration system shards out data to each silo and offers them portions of a query index range.

While such parallelization scale-out solutions allow for more parts of the index to be queried at the same time, they provide no mechanism for speeding up the query process itself. That limitation necessitates a sufficient degree of parallelization to accommodate the size of the dataset and expected time in which a query should be completed. Unfortunately, that is not a linear function, but rather a shallow curve. As greater virtualization and abstraction are added, the complexity and latency needed for all of the layers and sublayers to complete increases dramatically. As a result, underlying infrastructure layers can be more complex and consume more resources than do the actual data manipulation portions of the system. In addition, sharding is a poor solution for bursty data streams because it does not scale well instantaneously on-demand to accommodate peaks in data volume. Overall, the common practice of sharding introduces fragility, inefficiency, development complexity, and operational difficulty.

For example, as discussed above, in order to query a sharded database, datasets are commonly scaled by dividing each dataset into ~1 GB file size datasets for which legacy "Big Data" systems were designed. Those ~1 GB datasets may be spread over multiple resources, each of which must be queried separately and the results combined. If the files are distributed across hundreds or even thousands of servers as in e.g. a hyperscale database, the query processing speed is limited by increased query process complexity. In a system analyzing autonomous vehicle data, for example, such delays may prove completely unacceptable. Also, as files are updated over time, they may typically become fragmented, thereby introducing significant additional latencies. As a practical matter, it may prove infeasible to update all files to all storage media simultaneously in such a system. As a result, data discrepancies stemming from synchronization issues can easily lead to inaccuracies in query results.

A further level of complexity results from "Big Data" systems being in practice an ad hoc system of non-coordinated parts developed and integrated by disparate entities, each with their own objectives and reasons. Out of necessity, historical "Big Data" systems were always a collection of open source and or commercial software which is cobbled together to meet the needs of the Enterprise. Integration, optimization, and ongoing management of such systems present significant challenges, and the resultant unique and proprietary nature of the "Big Data" system of each enterprise necessitates internal maintenance thereof. In most cases the cost and time needed to build, maintain, and overcome the inconsistency and frailty of a "Big Data" system exceed the marketed value and efficiency by many multiples.

Even when such "Big Data" systems are implemented, results may fall short of expectations, and much farther still from their ultimate potential. For example, applying legacy sampling and filtering methods to modern "big data" analytics often involves reducing the volume and velocity of multiple data streams by passing them through a pipeline of tools to selectively extract a subset of the data from which monitor and draw conclusions, and to store those results for review or further computation. Optimizing the data subset requires significant skill and foresight. Regardless, discarding the remainder of the data destroys the capability to discover "new" or newly-relevant correlations from stored historical data. In enterprises using such legacy systems, business innovation and development may be stifled and opportunities may be missed due to the necessity to base decisions on incomplete information. Information technology is ripe and overdue for a revolution that changes the fundamental nature of shared resources to accommodate efficient storage and analysis of large-scale, e.g. hyperscale, datasets.

In modern network telemetry systems, for example, practical limitations of data storage, storage management and query processing frequently result in most of the data being ignored or discarded without analysis. Correlations go undetected, and confidence levels are compromised, by the limitations of current data analytics systems. A new technology is required in order to illuminate that "dark data" and unlock its secrets.

The aforementioned datasets have grown, for example from gigabytes per table on terabyte drives to petabyte sized tables spanning multiple drives. Furthermore, the data stored may be a combination of structured data and semi-structured data, driving the need for multiple datasets in the "data-lake" and an extrapolation layer to combine them. This inverse consumption of resources produces an environment wherein a single application can and often does consume the full hardware resource of the systems on which it is running.

In current data collection and telemetry systems, for example, the resiliency, availability, and synchronization of the stored data are limited by the speed with which a large-scale database can be updated across multiple storage resources. When the number of resources becomes large, operational efficiency becomes a major factor in introducing delays limiting the overall data relevance and integrity of the storage system.

Storage systems operations such as reading or writing are limited by two primary factors. The first is that while the processes of a given operation may be conducted in parallel, the operations themselves are executed in serial. That prevents, among many issues, two operations writing at the same time. The second is the speed at which each operation can occur. Relevant factors for speed include the time it takes to look up and then access the address location in storage, and the time to actually transfer the data (measured in Bytes per second). This factor is further compounded by the use of an operating system middleware which buffers access to the storage system and the stored bytes on which the requesting application works.

A key consideration is that the ingestion of scaled real-time datasets typically cannot be ordered in real time. Ordering of stored data on ingestion of each new record would generally require the reading of some or all of the previously-stored data to locate the proper insertion point for that record, and then the rewriting of every subsequent record. That effectively turns every write option into an ever-incrementing number of read and write operations. Some forms of storage which support direct memory access allow for write and read operations to occur simultaneously. Such systems may reduce the seek time required by the device controller to access the memory address location of the requested data in the storage medium.

Even with direct memory access, however, only when the ingest rate is low enough does such a storage media management scheme become feasible using real-time or batch processing. Otherwise, queries of real-world datasets that are not inherently ordered prior to ingestion or that do not have a confinement of the ordered data element must iterate over every record in the dataset, thereby severely impacting performance.

The strategy of multiplexing queries in such environments limits resource exhaustion or blockage by ensuring that longer-running queries are fully executed before shorter ones. Most commonly this assumes the form of a type of weighted queuing of the queries, or switching between queries after some time period or after certain records have been read. Both methods, however, are limited by the two fundamental factors of operation speed and the bandwidth of the storage medium.

In practice, integrity and availability of a record is most commonly maintained through replication, thereby ensuring the survival of data e.g. in the event of failure, corruption, or non-authoritative change of the memory addresses to which it is stored on a storage medium. Such replication may assume the form of comparative parity bit sequences or patterns on the same physical medium, or can be distributed across different physical media which may be widely dispersed. Options range from online storage which is instantaneously accessible, to cold storage which can take days to receive and restore.

Rather than merely collect and analyze a "snapshot" of key or summary data from critical nodes, the time has arrived for a more holistic approach that can be used to collect, store, query and correlate all of the available data from a hyperscale dataset stream in a timely and contemporaneous manner, to preserve data integrity, and to understand modern large-scale datasets in new and more insightful ways. Such a system and method overcoming legacy limitations are described below.

BRIEF SUMMARY OF THE INVENTION

A High-Performance Data Analytics (HPDA) system and method for processing voluminous data is disclosed. The system features a Record Storage Allocation System (RSAS) format for storing large data sets where resources cannot be shared and access to the data does not conform to standard Atomicity, Consistency, Isolation, Durability (ACID) concepts.

In particular, a system comprising system modules including one or more distribution modules, one or more storage modules, one or more aggregation modules, and one or more query manager modules, wherein the system modules are configured in a microservices architecture for storing and querying records, or aggregates of records, of a hyperscale dataset of aggregate size greater than one terabyte at rest, and wherein at least the one or more distribution modules, the one or more storage modules, the one or more aggregation modules, and the one or more query manager modules are operably interconnected and configured to transmit or receive data and machine-executable instructions is disclosed.

In the disclosed system, the one or more distribution modules are configured to receive a set of data records of a hyperscale dataset, and to distribute the set of data records to at least one of the one or more storage modules; the one or more storage modules are configured to manage the storage of data records of a hyperscale dataset as non-serialized binary sequences to at least one of a plurality of communicably connected block storage devices, without serialization to a file construct; the one or more aggregation modules are configured to aggregate a set of data records into an aggregate record, and to send the aggregate record to an at least one external target based at least in part on instructions received from at least one of the one or more query manager modules; and the one or more query manager modules are configured to receive an external query for select records or aggregates of records of a hyperscale dataset, and, in response to receiving the external query, and generate or execute machine-readable instructions to break the external query down into machine-executable components.

Regarding the configuration of the query module, breaking the external query down includes generating an at least one bitmask filter, wherein the at least one bitmask filter is sent to an at least one of the plurality of system modules, and wherein the at least one of the plurality of system modules is configured to use the at least one bitmask as a simple and straightforward device to select records or aggregates of records of a hyperscale dataset. The query module is also configured to manage record aggregation, and to designate the at least one external target to which the aggregate record should be sent.

The disclosed system is thereby designed to create a highly efficient flow of records read from one or more block storage devices by the one or more storage modules, to the one or more aggregation modules, to the at least one external target.

In some preferred embodiments, the aggregate record is sent to the at least one external target using a standard protocol such as SQL, RESTful, gRPC, or RDMA.

In some embodiments, the hyperscale dataset is an append-only set of data records formatted in a standardized digital record schema.

In some embodiments, the system is designed to be scaled to accommodate a larger hyperscale dataset or a higher volume of data by providing one or more additional system modules.

In some embodiments, the one or more distribution modules are further configured to designate at least one of the one or more storage modules to which to forward a received record.

In some embodiments, the one or more distribution modules are further configured to create a metadata record identifying the one or more storage modules to which the received record was forwarded.

In some embodiments, each of the one or more distribution modules is further configured, for each of the one or more storage modules to which it forwards at least one received record, to create a hash chain of the received records forwarded to that storage module by that distribution module, wherein the hash chain is used for the purposes of verifying and maintaining the state of the data stored within that storage module. In some embodiments, the one or more storage modules are further configured to store a received record as a non-serialized binary sequence, and wherein the non-serialized binary sequence is stored directly in a sequential memory location or block of a communicatively-connected block storage device, without any serialization or file construct.

In some embodiments, the one or more storage modules are further configured to create a metadata record identifying the storage device and the first sequential memory location or block on the storage device where the received record was stored.

In some embodiments, the one or more storage modules are further configured to create a hash chain of the forwarded records it has received, and to return the hash chain to the plurality of distribution modules from which the forwarded record was received, for the purposes of verifying and maintaining the state of the data stored by the storage module.

In some embodiments, the one or more query manager modules are further configured to execute the external query using a distributed process, and wherein executing the external query does not comprise dividing the query into a plurality of smaller independent and at most loosely-coordinated shard queries.

In some embodiments, the one or more query manager modules are further configured to create a distributed process by breaking the external query into a plurality of machine-executable components including a filtering component comprising a record filter in the form of a bitmask filter to be used to select a record and to designate a target to which the selected record is to be sent, wherein the target comprises at least one of the one or more distribution module or one or more of the at least one storage modules, and an aggregating component comprising an aggregate record filter in the form of a bitmask filter to be used to select an aggregate record, and to designate a target to which the selected aggregate record is to be sent.

In some embodiments, the one or more distribution modules are further configured to, in response to receiving a machine-executable component of the external query, designate at least one of the one or more storage modules to which to forward the at least one machine-executable component.

In some embodiments, the one or more storage modules are further configured to, in response to receiving a machine-executable component of the external query, read the metadata record identifying the storage device and the first sequential memory location or block on the storage device where the received record was stored, read memory locations or blocks of the identified block storage device sequentially, and use the at least one bitmask filter of the machine-executable component to select records to be sent to the at least one external target based on the metadata record.

In some embodiments, the one or more aggregation modules are further configured to, in response to receiving a machine-executable component of the external query and records of a hyperscale dataset, create an aggregate record, and to select an at least one aggregate record to forward to the at least one external target.

In some embodiments, the one or more aggregation modules are further configured to forward the at least one aggregate record in a common in-memory columnar format such as Apache Arrow to the at least one external target using remote direct memory access (RDMA).

In some embodiments, the at least one external target comprises an external worker instance of a distributed process.

In some embodiments, the system is further configured to be communicatively connected to an external data processor, wherein the external data processor provides a final aggregation of records, or of aggregate records, selected by a query, into a single result set, and wherein the external data processor is designated as a target in a machine-executable component of the external query.

Further disclosed is a method comprising providing system modules similar to the modules described above, including one or more distribution modules, one or more storage modules, one or more aggregation modules, and one or more query manager modules, and where those system modules are collectively configured in a microservices architecture for storing and querying records or aggregates of records of a hyperscale dataset of aggregate size greater than one terabyte at rest.

To perform the method, at least the one or more distribution modules, the one or more storage modules, the one or more aggregation modules, and the one or more query manager modules are operably interconnected and configured to transmit or receive data and machine-executable instructions which, upon execution, result in receiving, by an at least one of the one or more distribution modules, a set of data records of a hyperscale dataset; distributing, by the at least one of the one or more distribution modules, the set of data records to an at least one of the one or more storage modules; managing, by the at least one of the one or more storage modules, the storage of the set of data records as non-serialized binary sequences to at least one of a plurality of communicably connected block storage devices, without serialization to a file construct; aggregating, by the one or more aggregation modules, the set of data records into an aggregate record; sending, by the one or more aggregation modules, the aggregate record to an at least one external target based at least in part on instructions received from an at least one of the one or more query manager modules; receiving, by the at least one of the one or more query manager modules, an external query for select records or aggregates of records of a hyperscale dataset, and, in response to receiving the external query, breaking the external query down into machine-executable components, wherein breaking the external query down further comprises generating an at least one bitmask filter; sending, to an at least one of the plurality of system modules, the at least one bitmask filter, wherein the at least one of the plurality of system modules uses the at least one bitmask filter to select records of a hyperscale dataset or aggregates thereof; and designating, by the at least one of the one or more query managers, the at least one external target to which the aggregate records should be sent. The method provides a highly efficient flow of records read from one or more block storage devices by the one or more storage modules, to the one or more aggregation modules, to the at least one external target.

In some embodiments of the foregoing method, the hyperscale dataset is an append-only set of data records formatted in a standardized digital record schema.

Some embodiments of the foregoing method include designating, by at least one of the one or more distribution modules, at least one of the one or more storage modules to which to forward a received record.

Some embodiments of the foregoing method include creating, by at least one of the one or more distribution modules, a metadata record identifying the one or more storage modules to which the received record was forwarded.

Some embodiments of the foregoing method include creating, by each of the one or more distribution modules and for each of the one or more storage modules to which that distribution module forwards at least one received record, a hash chain of the received records forwarded to that storage module by that distribution module, wherein the hash chain is used for the purposes of verifying and maintaining the state of the data stored within that storage module. The distribution module may generate a hash representing an index of the key-value (KV) pair in a hash table.

Some embodiments of the foregoing method include storing, by at least one of the one or more storage modules, a received record as a non-serialized binary sequence, wherein the non-serialized binary sequence is stored directly in a sequential memory location or block of a communicatively-connected block storage device, without any serialization or file construct.

Some embodiments of the foregoing method include creating, by at least one of the one or more storage modules, a metadata record identifying the storage device and the first sequential memory location or block on the storage device where the received record was stored.

Some embodiments of the foregoing method include creating, by at least one of the one or more storage modules, a hash chain of the forwarded records it has received and returning the hash chain to the plurality of distribution modules from which the forwarded record was received, for the purposes of verifying and maintaining the state of the data stored by the storage module.

Some embodiments of the foregoing method include executing, by an at last one of the one or more query manager modules, the external query using a distributed process, wherein executing the external query does not comprise dividing the query into a plurality of smaller independent and at most loosely-coordinated shard queries.

Some embodiments of the foregoing method include creating, by at least one of the one or more query manager modules, a distributed process by breaking the external query into a plurality of machine-executable components including a filtering component comprising a record filter in the form of a bitmask filter to be used to select a record and to designate a target to which the selected record is to be sent, wherein the target comprises at least one of the one or more distribution module or one or more of the at least one storage modules, and an aggregating component comprising an aggregate record filter in the form of a bitmask filter to be used to select an aggregate record, and to designate the at least one external target to which the selected aggregate record is to be sent.

Some embodiments of the foregoing method include designating, by at least one of the one or more distribution modules and in response to receiving a machine-executable component of the external query, at least one of the one or more storage modules to which to forward the at least one machine-executable component.

Some embodiments of the foregoing method include reading, by at least one of the one or more storage modules and in response to receiving a machine-executable component of the external query, memory locations or blocks of the indicated block storage device sequentially using the at least one bitmask filter to select records to be sent to the at least one external target based on the metadata record.

Some embodiments of the foregoing method include creating, by at least one of the one or more aggregation modules and in response to receiving a machine-executable component of the external query and records of a hyperscale dataset, an aggregate record, and, using the at least one bitmask filter, selecting an at least one aggregate record to forward to the at least one external target.

Some embodiments of the foregoing method include forwarding, but at least one of the one or more aggregation modules, the at least one aggregate record, wherein the at least one aggregate record is forwarded in a common in-memory columnar format such as Apache Arrow to the at least one external target using remote direct memory access (RDMA).

In some embodiments of the foregoing method, the at least one external target comprises an external worker instance of a distributed process.

Some embodiments of the foregoing method include providing an external data processor communicatively connected to the system, wherein the external data processor provides a final aggregation of records, or of aggregate records, selected by a query, into a single result set, and wherein the external data processor is designated as a target in a machine-executable component of the external query.

DETAILED DESCRIPTION AND BEST MODE OF IMPLEMENTATION

Figure 1:
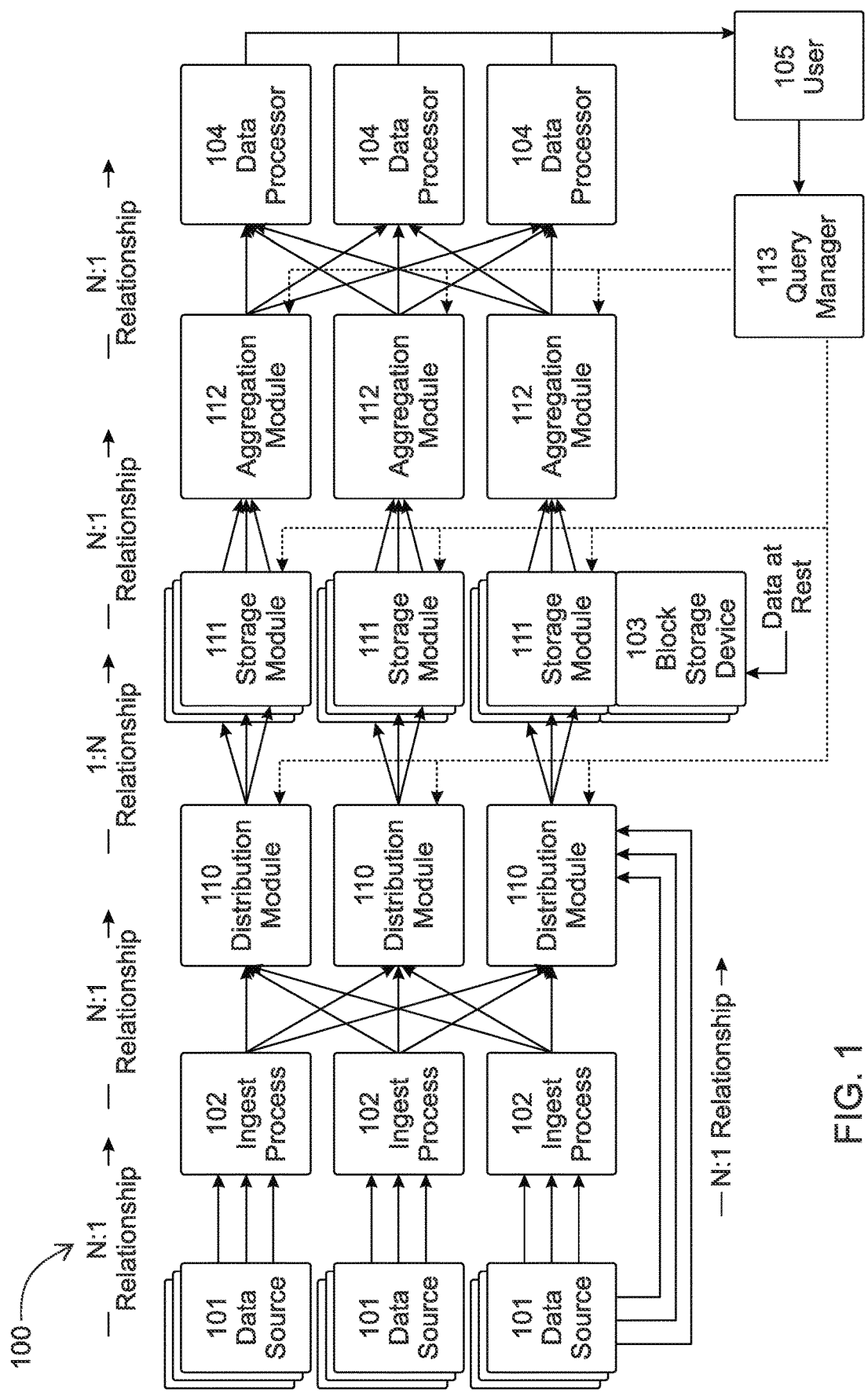
FIG. 1 illustrates a data analytics system 100 in accordance with a preferred embodiment of the present invention.

Embodiments of the present invention will now be described in detail with reference to the drawings, which are provided as illustrative examples so as to enable those skilled in the art to practice the invention. Notably, the figures and example(s) below are not intended to limit the scope of the present invention to a single embodiment, but other embodiments are possible by way of interchange of some or all of the described or illustrated elements. A modern network data collection and telemetry system is used as an illustrative example, and does not limit the scope of the invention. The system and method are broadly applicable.

Wherever convenient, the same reference numbers will be used throughout the drawings to refer to same or like parts or steps. Where certain elements of these embodiments can be partially or fully implemented using known components, only those portions of such known components that are necessary for an understanding of the present invention will be described, and detailed descriptions of other portions of such known components will be omitted so as not to obscure the invention.

In the present specification, an embodiment illustrating a singular component should not be considered limiting. Rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

For example, various disclosed functions may be assigned to a plurality of different modules. However, a skilled artisan will immediately recognize that the scope of the invention includes a system wherein the relevant functions are distributed differently among the modules, for example, and that references to a singular module include one or more modules, even when such variations or embodiments are not explicitly described. Similarly "records" may refer to individual records, blocks of records, or batches of records.

An improved system and method for data analytics is disclosed below. The features and advantages of the disclosed method and apparatus will become more apparent to those skilled in the art after considering the following detailed description in connection with the accompanying drawings.

By way of non-limiting examples, applications may include network telemetry, self-driving cars, astronomy, population census analysis, toll road system data, political election returns, various military applications, income tax calculation and processing, climate change analysis, facial recognition, pharmaceutical development, optimizing business performance, correlating worldwide scientific data on virtually any topic to eliminate statistical variations and discover new correlations, etc. Virtually any large-scale voluminous and at least partially structured data stream can be advantageously analyzed in the manner disclosed herein, particularly high velocity volumetric data.

This disclosure describes a novel and improved data analytics system and method applicable to large data systems. The system and method embodiments may comprise hardware, software, and methodology implementing various combinations of features such as:

1) A Format enabling a method for directly storing data of a single dataset in a physical medium without virtualization or extrapolation, constituting an optimized system for write once read many (WORM) times data used for complex analytics. A Record Storage Allocation System (RSAS) is an example of such a format, in accordance with some embodiments described herein.

2) A Data Storage Module for the management of pre-formatted physical storage media such as HDD, SSD, Flash, and/or RAM. The module includes the process of writing in a low trust reliability environment and filtered reading and streaming of stored data. An RSAS Media Management (RMM) is an example of such a data storage module, in accordance with some embodiments described herein;

3) A Distribution Module for clustering data storage modules and pre-formatted physical storage. The distribution module includes the processes of receiving the set of records of a hyperscale dataset, and distributing those records among the storage modules to create a high-availability distributed system where every node is an active system in a distributed process. The distribution module also distributes and tracks the placement of records of an append-only hyperscale dataset across multiple physical storage media or devices, for example in the form of sequentially stored non-serialized binary sequences such as records, blocks of records or small batches of records. An RSAS Cluster Controller (RCC) is an example of such a distribution module, in accordance with some embodiments described herein.

4) A Query Manager Module to receive an external query for select records or aggregates of records of a hyperscale dataset, and, in response to receiving the external query, generate or execute machine-readable instructions to break the external query down into machine-executable components. A Query Manager is an example of such a query manager module, in accordance with some embodiments described herein.

5) An RSAS Database Repository and Deployment System (RD2S): An RD2S stores and shares complete systems, modules, and/or algorithms used in an RSAS Data System, including the deployment of processes to RMMs, RCCs, IQSs, and standard compute process such as data ingest and visualization.

6) An Aggregation Module to aggregate a set of data records into an aggregate record, and to send the aggregate record to an at least one external target based at least in part on instructions received from a query manager module. An Interrupted Querying Systems (IQS) node is an example of an embodiment of at least some aspects of an aggregation module. An interrupted queuing system breaks the querying process into a distributed system similar to a microservices architecture wherein each function is a distributed single task process. In that manner, a single storage system can process data in many different ways. The IQS may include the capability to morph, fork, and process data in the stream at various IQS nodes. The IQS may be applicable, for example, to super aggregation and analytics such as p95 by an hour or distributed AI processing.

High Performance Data Analytics System

A data analytics system 100 in accordance with a preferred embodiment is illustrated in FIG. 1 in relation to a data source 101, an ingest process 102, a block storage device 103 and a data processor 104 external to the system. The system includes various system modules arranged in a microservices architecture. The core system modules are made up of distribution modules 110, storage modules 111, aggregation modules 112 and at least one query manager module 113. An end user 105 interacts with the system via a user interface of the data processor which may function as an external aggregator performing further data aggregation, analysis and/or representation.

The ingest process 102 takes in records received from a data source, where those records are, in preferred embodiments of the present invention, processed at least to normalize them and render them in a format usable by the system; an example of such a format is discussed in detail below.

Figure 2:
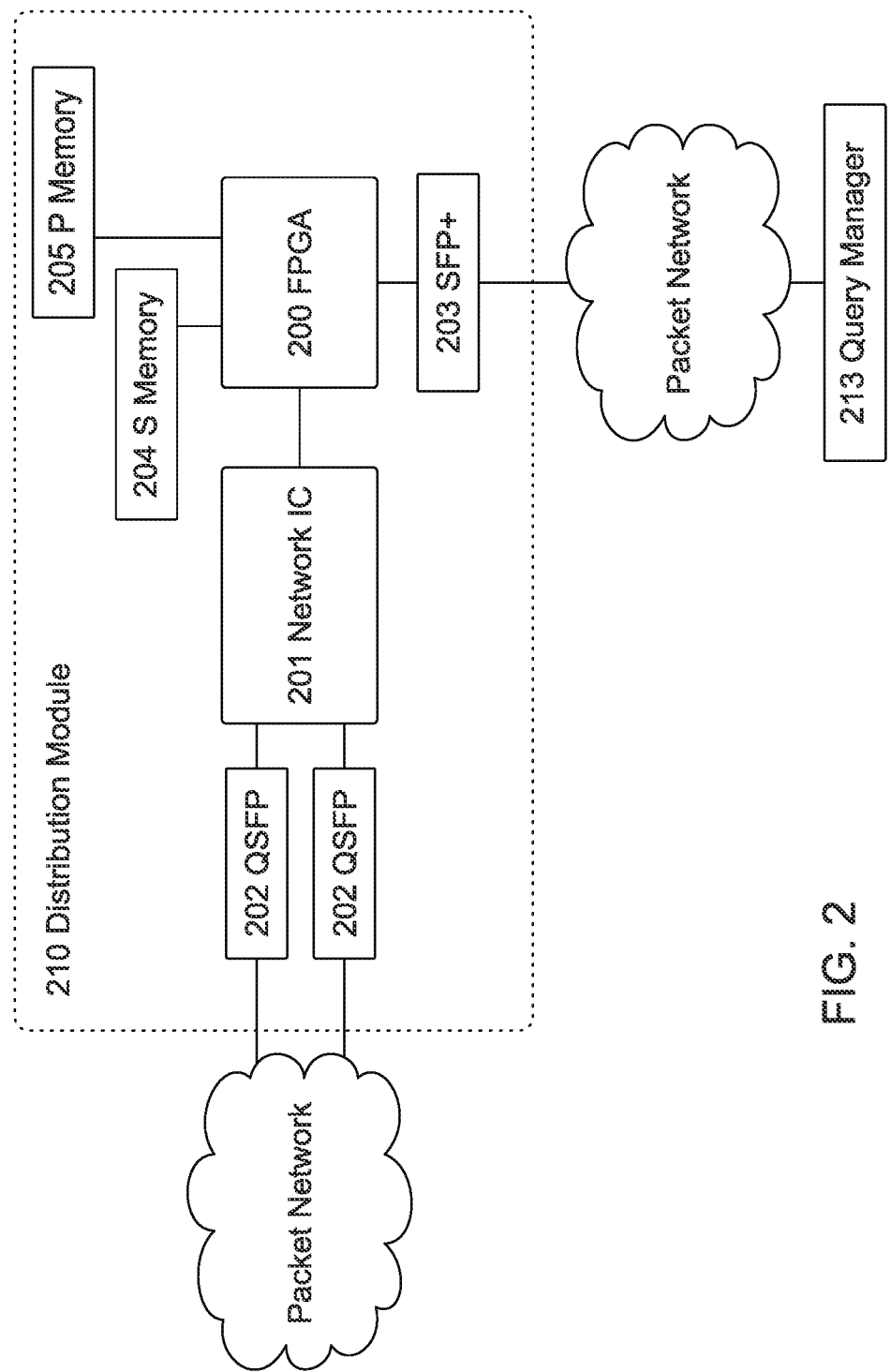
FIG. 2 illustrates a physical implementation of a distribution module in accordance with some embodiments of the present invention.

FIG. 2 shows a high-level illustration of a possible physical implementation of a Distribution Module 210. Primary components include a field-programmable gate array (FPGA) 200 and an integrated circuit (IC), in this example Network IC 201, operably connected to the FPGA.

Figure 3:
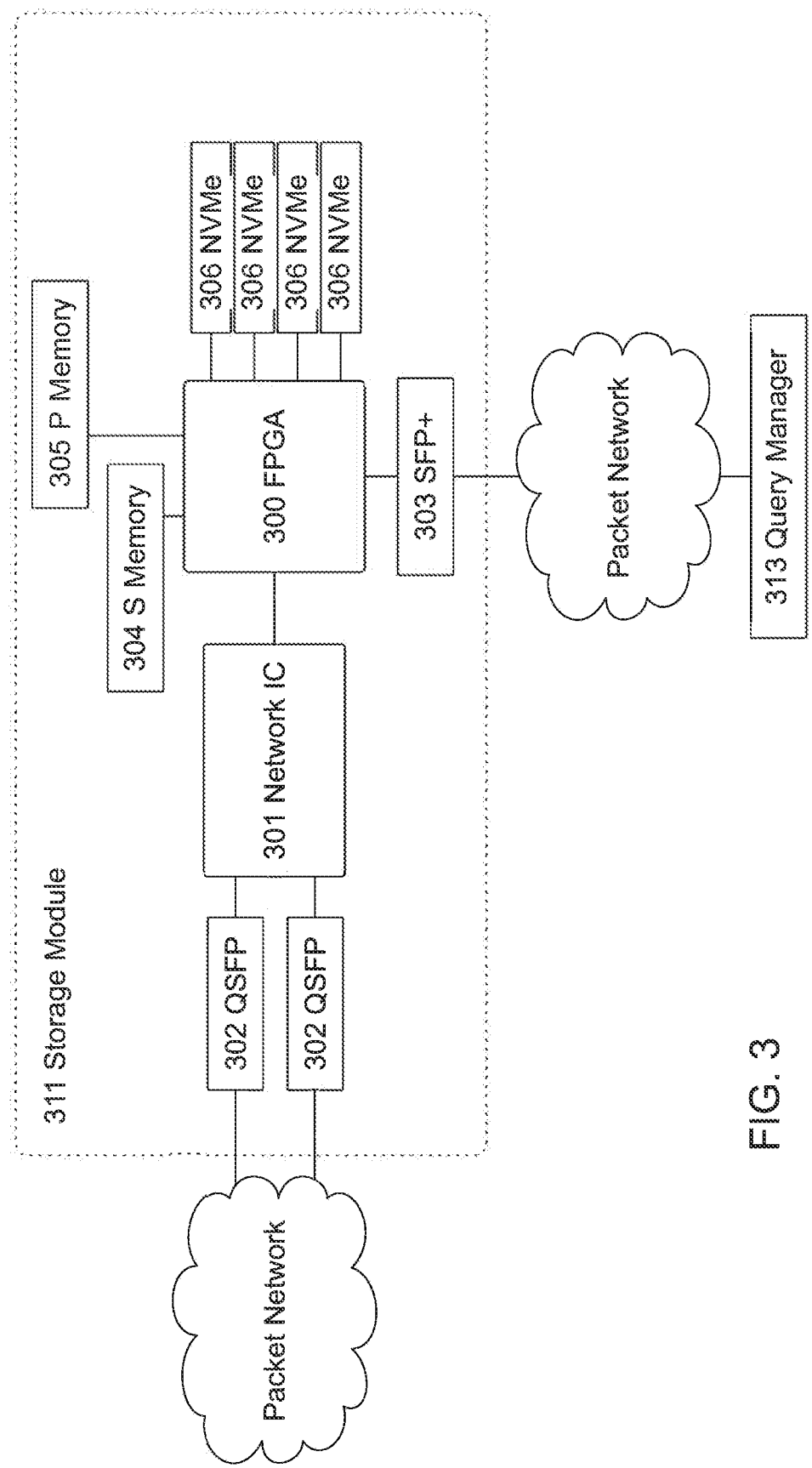
FIG. 3 illustrates a physical implementation of a storage module in accordance with some embodiments of the present invention.

FIG. 3 shows a high-level illustration of a possible physical implementation of a Distribution Module 311. Primary components include an FPGA 300 operably connected to non-volatile memory express (NVMe) 303, and a Network IC 301 operably connected to the FPGA.

Figure 4:
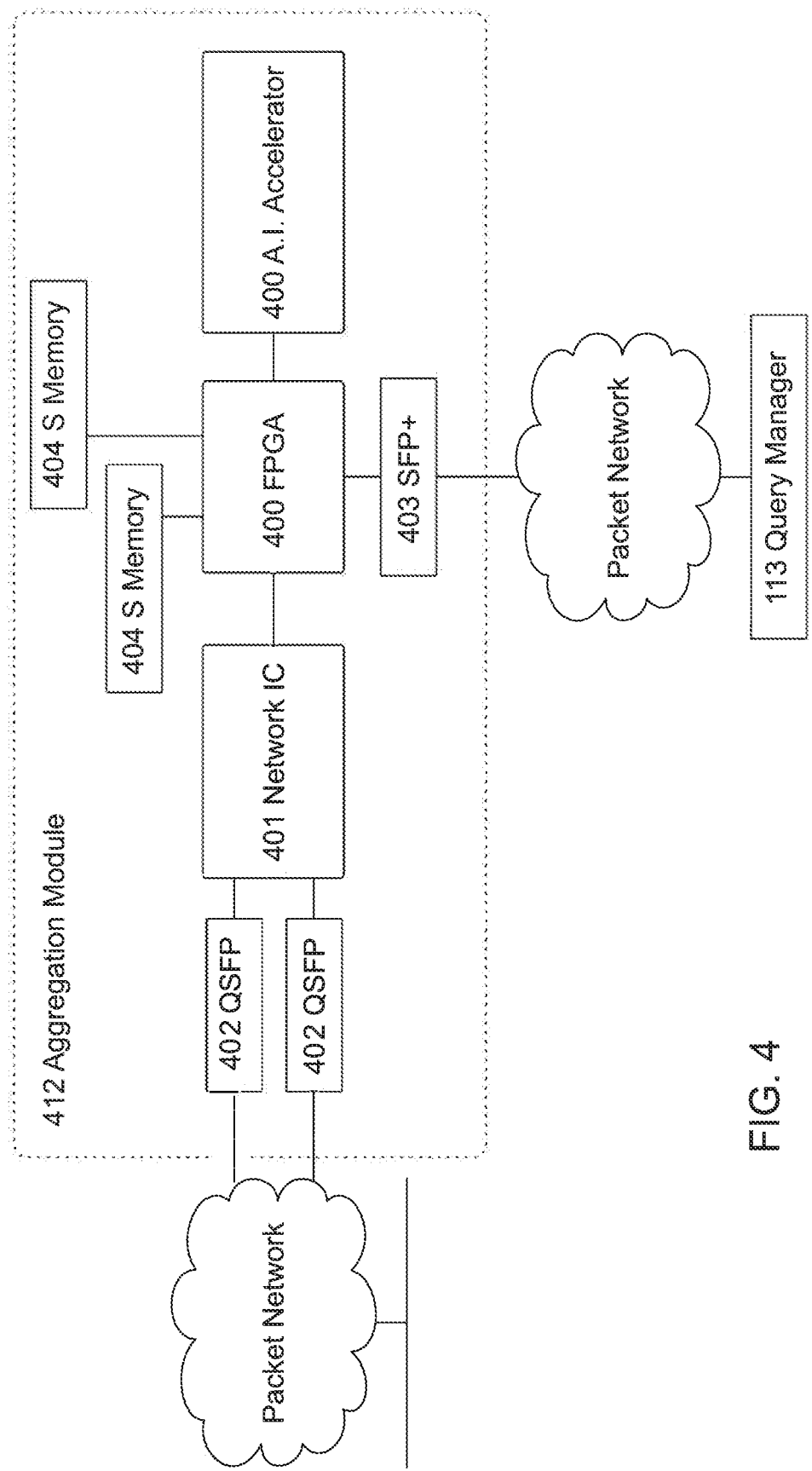
FIG. 4 illustrates a physical implementation of an aggregation module in accordance with some embodiments of the present invention.

FIG. 4 shows a high-level illustration of a possible physical implementation of a Distribution Module 412. Primary components include an FPGA 400 and a Network IC 401 operably connected to the FPGA.

The foregoing high-level illustrations provide a simple conceptual understanding as to how the system modules could be implemented. In some preferred embodiments, a single Network IC specific to each module type above performs the primary function of the module as shown. In other embodiments, the Network IC shown in FIG. 6, FIG. 5 and FIG. 6 may represent more than one IC, and/or additional components may contribute to the function of the module. One of ordinary skill in the art will recognize the equivalence of such embodiments or implementations.

Referring to FIG. 1, data, for example a hyperscale dataset, from the data source enters the system via the ingest process 101, which may translate the communication protocol or otherwise prepare the data to enter the core system, select one or more distribution modules, and send at least a subset of the data to the selected distribution module(s). In some preferred embodiments, the hyperscale dataset is an append-only set of data records formatted in a standard digital record schema, and of at least one terabyte in size at rest.

A distribution module 110 receiving data from the ingest process distributes the ingested data to one or more of the storage modules, each of which is in turn connected to at least one block storage device. In some preferred embodiments, the distribution module is designed to designate one or more storage modules to which to forward a received record for storage, and/or to create a metadata record of the storage locations of all of the records that the distribution module forwards for storage. In addition, the distribution module may create a hash chain of the forwarded records to use to verify and maintain the state of the one or more storage modules. In some embodiments, when the distribution module receives a machine-executable component of the external query, it is designed to designate at least one storage module to which to send the machine-executable component.

The function of a storage module 111 is to store the data it receives in block storage 103, such that the ingested records are not conformed to a file format, and to make a record of the location of where the ingested records are stored. For example, the storage module may store a received record as a non-serialized binary sequence directly in a sequential memory location or block of a block storage device, without any serialization or file construct. In some embodiments, the storage module may create a metadata record identifying the storage device and the first sequential memory location or block of the storage device on where the record was stored.

In some embodiments, the one or more storage modules are designed to respond to receiving a machine-executable component of an external query by retrieving records, facilitated by the metadata record. For example, a storage module may read the metadata record identifying the storage device and the first sequential memory location or block on the storage device where the received record was stored, read memory locations or blocks of the identified block storage device sequentially, and use a bitmask filter of the machine-executable component to select records to be sent to the at least one external target, based on the metadata record.

Records are retrieved from block storage by means of a query. In the process of executing a query to return a query result, the system employs Aggregation Modules 112 configured to aggregate a set of data records into an aggregate record to be sent to an external target such as a Data Processor 103. In some embodiments, an aggregation module is designed to respond to receiving a machine-executable component of a query and records from a hyperscale dataset, create and aggregate record, and to select at least one aggregate record to forward to the external target. Because the records are never serialized to a file format, they can be stored and retrieved efficiently without the use of objects or file constructs. In some other embodiments, the aggregate record is forwarded to the external target using remote direct memory access (RDMA).

A query manager module is designed to receive an external query for select records, or for aggregates of records, of a hyperscale dataset. On receipt of the external query, the query manager module generates or executes machine-executable instructions to break the query down into machine-executable components to create a distributed process, as opposed to, for example, running a parallel shard query on a partitioned table. The query manager module creates the distributed process for running the external query by generating bitmask filters for other system modules to use to filter and select records or aggregates of records of a hyperscale dataset, manages the aggregation of records thereby selected, and designates an external target to which to send the aggregate record.

For example, in some preferred embodiments the query manager module generates machine-executable components including a filtering component such as a record filter in the form of a bitmask filter, to be used to select a record and to designate a target distribution or storage module to which the selected record is to be sent, and an aggregating component such as an aggregate record filter in the form of a bitmask filter, to be used to select an aggregate record, and to designate the at least one external target to which the selected aggregate record is to be sent. In another embodiment, the external target is a worker instance of a distributed process, such as artificial intelligence (AI) or machine learning (ML). In some other embodiments, the query manager module is connected to an external data processor designated as an external target, and configured to provide a final aggregation of records, or of aggregates of records, selected by a query, into a single result set.

The modules combine to create a scalable system easily expanded by merely installing additional system modules, such that an increasing volume of data may be accommodated, for example by using the following method.

First, a plurality of system modules collectively configured in a microservices architecture similar to the one described above for storing and querying records or aggregates of records of a hyperscale dataset of aggregate size greater than one terabyte at rest must be provided and communicably connected to a data source, for example a network telemetry data stream or hyperscale database. The system modules are configured to received machine-executable instructions which, upon execution, result in the following method steps being performed. In some preferred embodiments, the hyperscale dataset is an append-only set of data records formatted in a standardized record schema.

A distribution module receives a set of data records of a hyperscale dataset from an ingest process and distributes the set of data records to an at least one of the one or more storage modules. In some preferred embodiments, the distribution module designates one or more storage modules to which to forward a received record for storage, and/or to create a metadata record of the storage locations of all of the records that the distribution module forwards for storage. In addition, the distribution module may create a hash chain of the forwarded records to use to verify and maintain the state of the one or more storage modules. In some embodiments, when the distribution module receives a machine-executable component of the external query, it designates at least one storage module to which to send the machine-executable component.

A storage module manages the storage of the set of data records as non-serialized binary sequences to at least one of a plurality of communicably connected block storage devices, without serialization to a file construct. In some embodiments, the storage module may create a metadata record identifying the storage device and the first sequential memory location or block of the storage device on where the record was stored.

In some embodiments, the one or more storage modules respond to receiving a machine-executable component of an external query by retrieving records, facilitated by the metadata record. For example, a storage module may read the metadata record identifying the storage device and the first sequential memory location or block on the storage device where the received record was stored, read memory locations or blocks of the identified block storage device sequentially, and use a bitmask filter of the machine-executable component to select records to be sent to the at least one external target, based on the metadata record.

An aggregation module aggregates the set of data records into an aggregate record and sends the aggregate record to an at least one external target based at least in part on instructions received from an at least one of the one or more query manager modules. In the process of executing a query to return a query result, the system employs Aggregation Modules 112 to aggregate a set of data records into an aggregate record to be sent to an external target such as a Data Processor 103. In some embodiments, an aggregation module response to receiving a machine-executable component of a query and records from a hyperscale dataset, creates and aggregate record, selects at least one aggregate record to forward to the external target. Because the records are never serialized to a file format, they can be stored and retrieved efficiently without the use of objects or file constructs. In some other embodiments, the aggregate record is forwarded to the external target using remote direct memory access (RDMA).

A query manager module receives an external query for select records or aggregates of records of a hyperscale dataset, and, in response, breaks the external query down into machine-executable components, wherein breaking the external query down includes generating at least one bitmask filter and sending the bitmask filter to an at least one of the system modules, wherein the at least one of the system modules uses the at least one bitmask filter to select records of a hyperscale dataset or aggregates thereof, and designates the at least one external target to which the aggregate records should be sent.

For example, in some preferred embodiments the query manager module generates machine-executable components including a filtering component such as a record filter in the form of a bitmask filter, to be used to select a record and to designate a target distribution or storage module to which the selected record is to be sent, and an aggregating component such as an aggregate record filter in the form of a bitmask filter, to be used to select an aggregate record, and to designate the at least one external target to which the selected aggregate record is to be sent. In another embodiment, the external target is a worker instance of a distributed process, such as artificial intelligence (AI) or machine learning (ML). In some other embodiments, the query manager module is connected to an external data processor designated as an external target, and configured to provide a final aggregation of records, or of aggregates of records, selected by a query, into a single result set.

Figure 5:
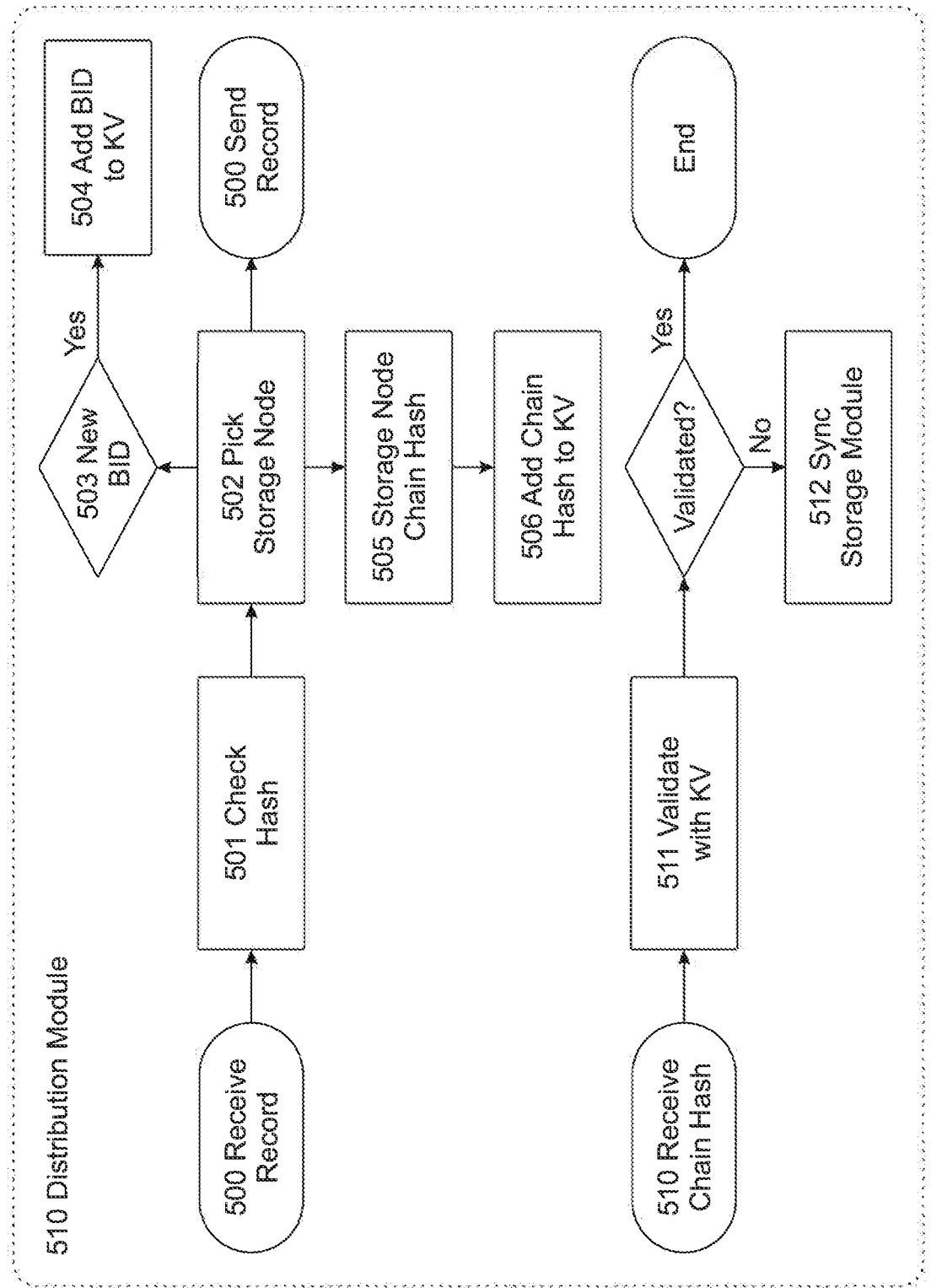
FIG. 5 shows a flow diagram of a distribution module in accordance with some embodiments of the present invention.
Figure 6:
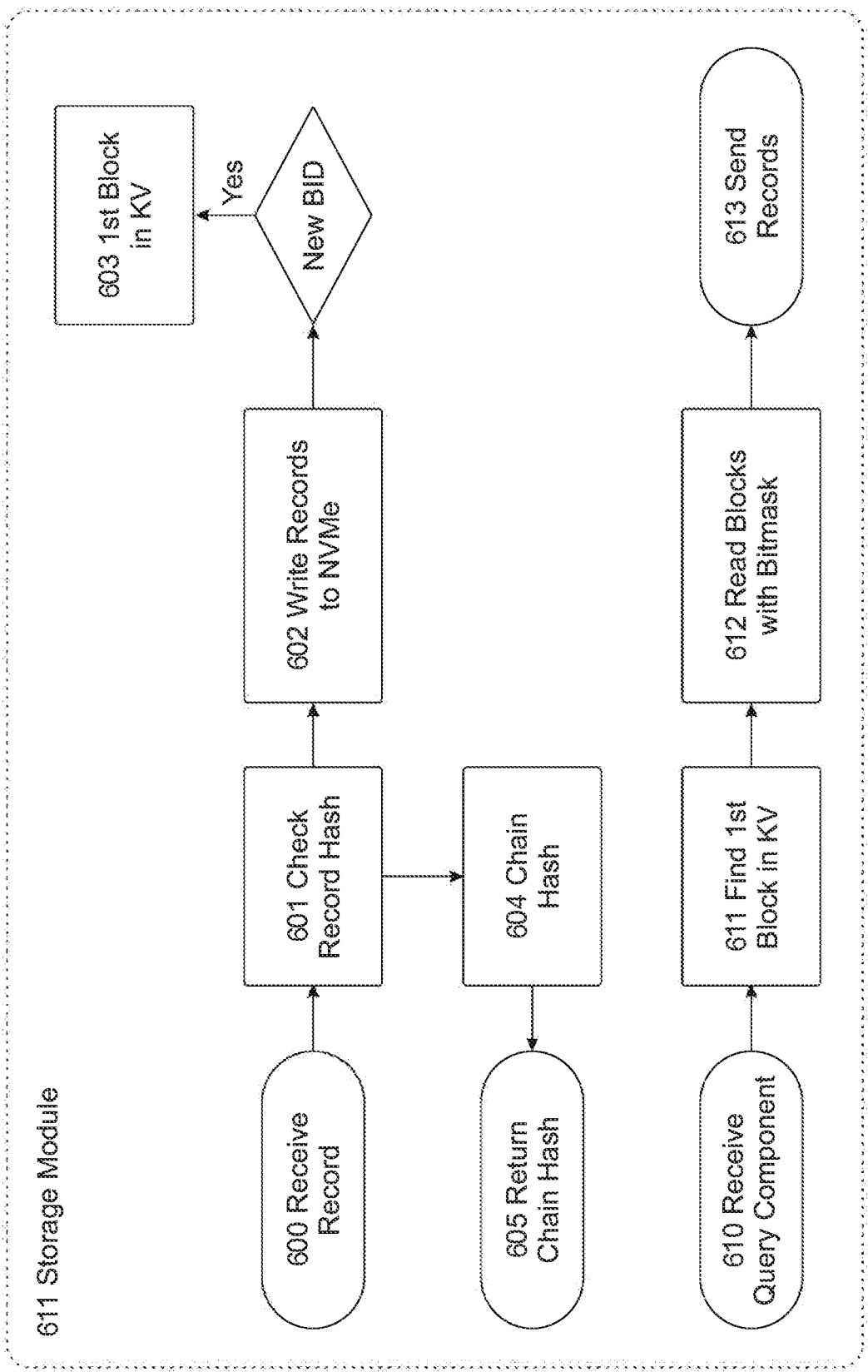
FIG. 6 shows a flow diagram of a storage module in accordance with some embodiments of the present invention.
Figure 7:
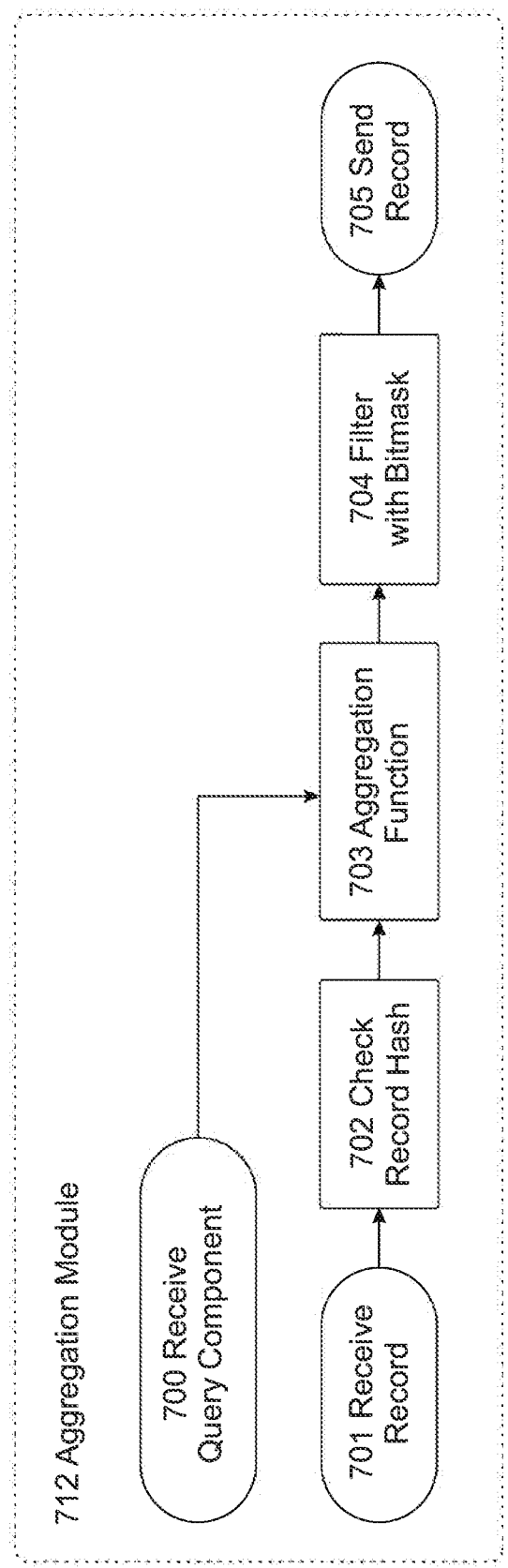
FIG. 7 shows a flow diagram of an aggregation module in accordance with some embodiments of the present invention.

FIG. 5, FIG. 6, and FIG. 7 show flow diagrams for a distribution module, a storage module, and an aggregation module, respectively, in accordance with some embodiments.

Figure 8:
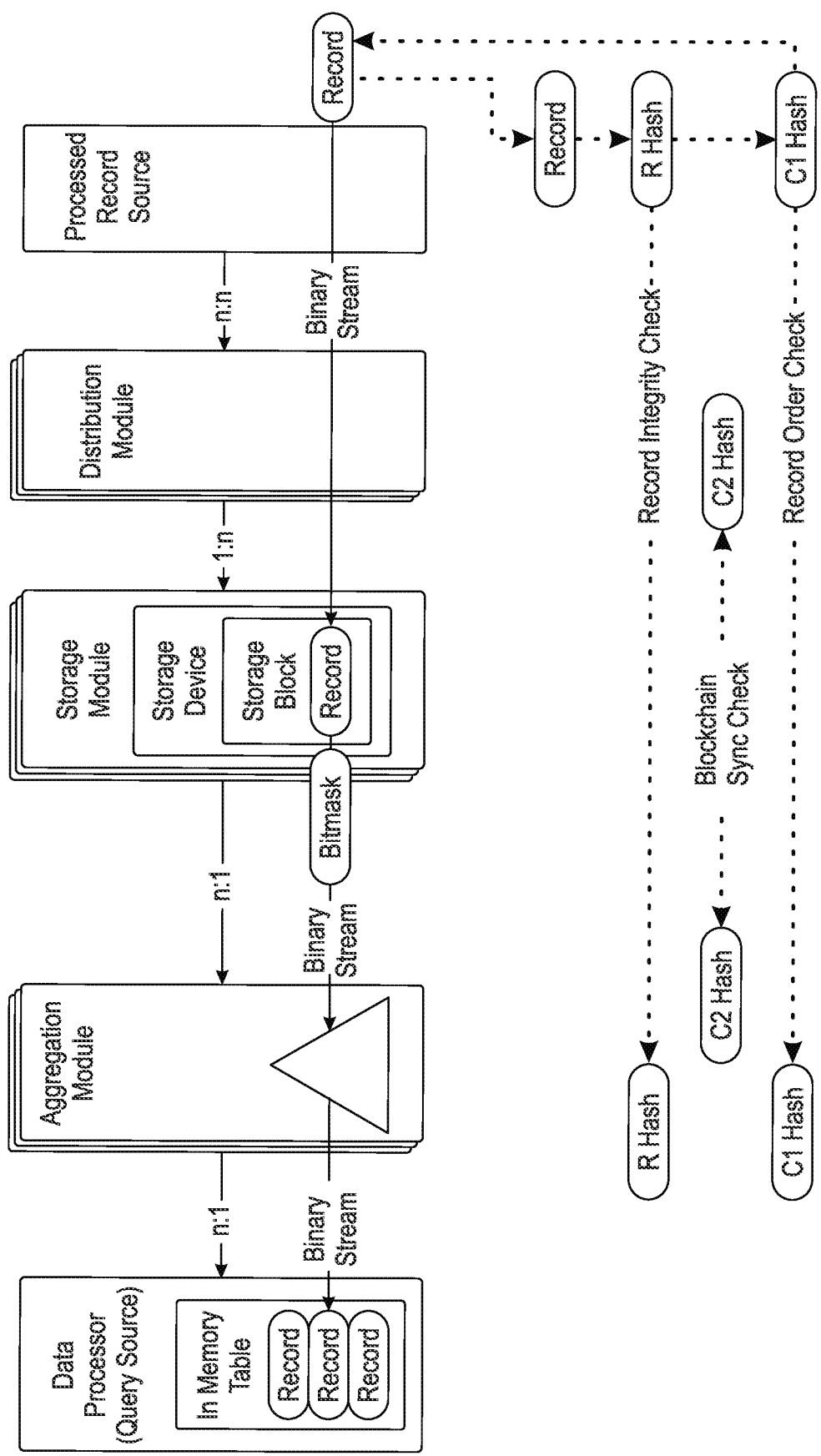
FIG. 8 illustrates various aspects of the use of hash chains in accordance with some preferred embodiments of the present disclosure.

FIG. 8 illustrates several aspects of the use of hash chains in accordance with some preferred embodiments of the present disclosure. Note that data flows from right to left in this diagram.

RECORD STORAGE ALLOCATION SYSTEM—A Record Storage Allocation System (RSAS) comprising a format for storing data into either volatile or nonvolatile memory is disclosed. The RSAS is a novel and unique method which addresses a long-felt need presented by the real-world challenges of modern large-scale pervasive data collection and analysis and analytics applications. The RSAS format has initially been optimized for use in scaled datasets over 1 TB in size at rest on directly-addressable memory location storage media types such as Solid-State Disk (SSD) or Random-Access Memory (RAM). However, the RSAS concept and format are generally applicable, and by no means limited to those media.

Recognizing that each hyperscale data-based application may fully consume a given storage resource, an RSAS addresses both the storage media and the data stored thereon as a non-shared resource which is only consumed by a single data manipulator. Further, an RSAS addresses the nature of both structured and semi-structured. Rather than treating semi-structured data as a blob within a containing structured data element, RSAS treats it as an allocation of storage space mapped from the structured portion of the data.

In an RSAS format, unstructured data is put into a referenceable framework and/or related to other metadata directly or indirectly. With that understanding, an RSAS system addresses unstructured data as a component of semi-structured data.

While an RSAS is designed with a dataset in which records are a mix of structured and semi-structured data in mind, it can be used to store records with a homogeneous data format. In such purely homogeneous cases, an RSAS may optionally use the RSAS elements designed for a record's data format which is not in use. Specifically, an RSAS may divide storage locations into one or more headers, structured data, and semi-structured data. An RSAS neither defines nor excludes encryption and or compression.

In some embodiments, encryption and or compression may be a function of the application which is using the dataset.

For the purposes of this disclosure, a "header" is an array of fixed byte groupings which may be used to define the structure of the RSAS for a given storage unit. In a preferred embodiment, an RSAS-formatted physical or logical storage unit is assigned a unique header using the first bytes of the storage unit. The same header may be repeated, for example using the last bits of the storage unit. Optionally, additional copies of the header may be stored at other locations within the storage unit.

Figure 9:
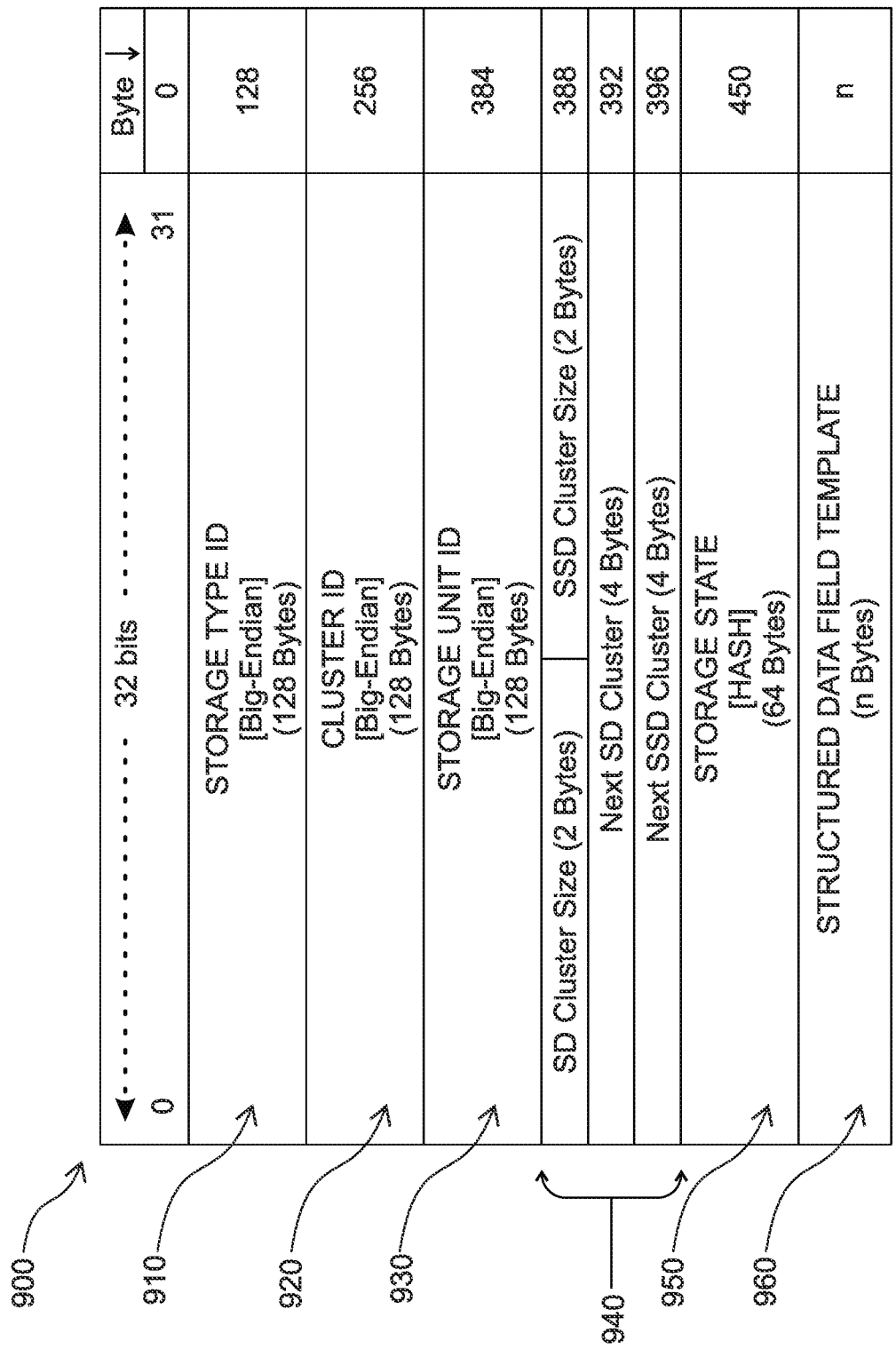
FIG. 9 shows a bit layout diagram describing a sample RSAS format header in accordance with some embodiments of the present invention.

FIG. 9 shows a bit layout diagram 900 describing an example of an RSAS format header. The embodiment shows a header for a big-endian system which stores the most significant byte of a word at the smallest memory address and the least significant byte at the largest, however that choice is arbitrary and not limiting.

The RSAS header of FIG. 9 comprises a Storage Type ID 910 which defines the storage unit as an RSAS. More specifically, the ID can be a compound set of bytes which defines the storage unit as a specific RSAS format and the ID of the format of the bytes used in structured data elements of the dataset. The example of FIG. 9 shows a 128-byte Storage Type ID.

In this example, the RSAS header comprises a Cluster ID 920 which defines the group of one or more RSAS storage units to which all format and data of a dataset is replicated and a Storage Unit ID 930 which uniquely identifies a single RSAS storage unit. FIG. 9 shows 128 bytes of the RSAS header dedicated to each.

The RSAS header example illustrated in FIG. 9 further comprises bytes containing information concerning storage unit size and availability 940. Those include 2 bytes specifying SD Cluster Size for structured data and 2 bytes specifying the SSD Cluster Size for semi-structured data, where the SD Cluster Size and the SSD Cluster size define 1) a standard size of a cluster of bytes and is equal in part or whole to the size in bytes of the structured data portion of a record of the dataset stored using that RSAS based storage unit, and (2) a standard unit of bytes within which the semi-structured data portion of a single record completely or in part fits, respectively.

In some embodiments, the semi-structured data portion of a single record may utilize some or all of the bytes of one or more clusters in such a manner that no cluster holds the semi-structured data portions of more than one record.

The bytes containing information concerning storage unit size and availability 940 further comprise 2 bytes associated with a Next Open SD Cluster which points to the memory location where the next structured data portation of a record should be written, and 2 bytes associated with a Next Open SSD Cluster which points to the memory location where the next semi-structured data portation of a record should be written.

Optionally, referring to FIG. 9, the header associated with the RSAS may comprise one or more Storage State 950 which represents the sequential hash of the last written, or modified, or removed record or record part as well as the hash of the previous last written, modified, or removed record or record part, for example up to 64 bytes of information.

Optionally, in some embodiments, the header associated with the RSAS may comprise a Structured Data Field Template 960 which may in turn comprise a Template Length which represents the number of bytes used by the Data Field Template including that element, or the count of the Data Fields defined in the Data Field Template.

Figure 10:
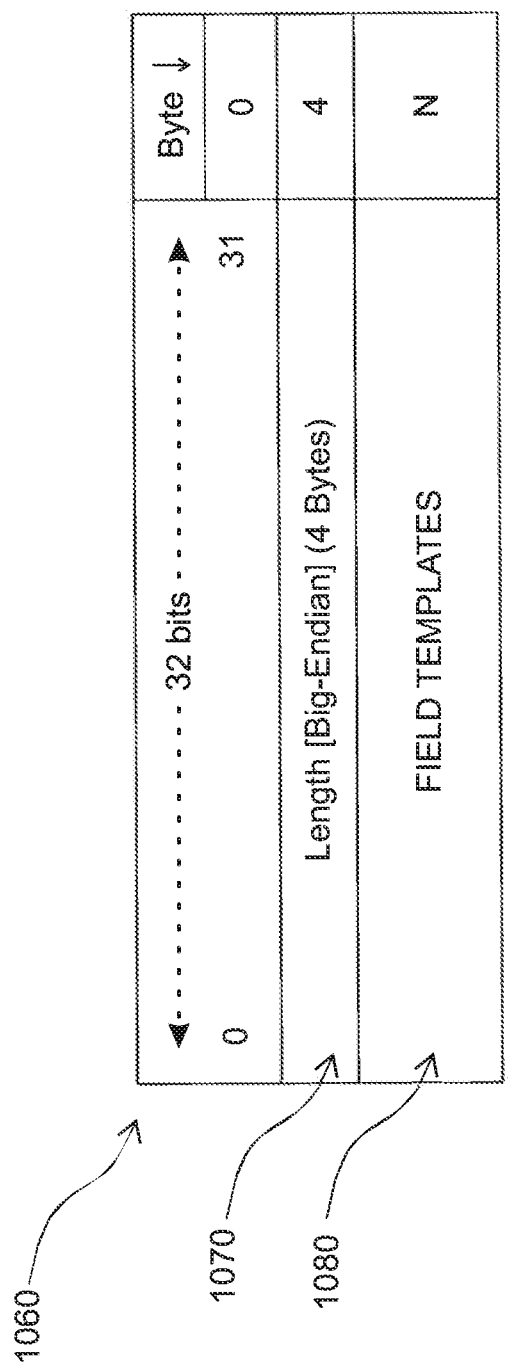
FIG. 10 shows a bit layout diagram describing a Structured Data Field Template which is attached to the RSAS format header in accordance with some embodiments.

A sample Structured Data Field Template 1060 for inclusion in RSAS header 900 is shown is FIG. 10. The Structured Data Field Template 960 comprises one or more Structured Data Field Template Elements such as a Template Length 1070 which represent the number of bytes used by the Data Field Template Element including that component. The Structured Data Field Template may further comprise one or more Field Templates 1080.

Figure 11:
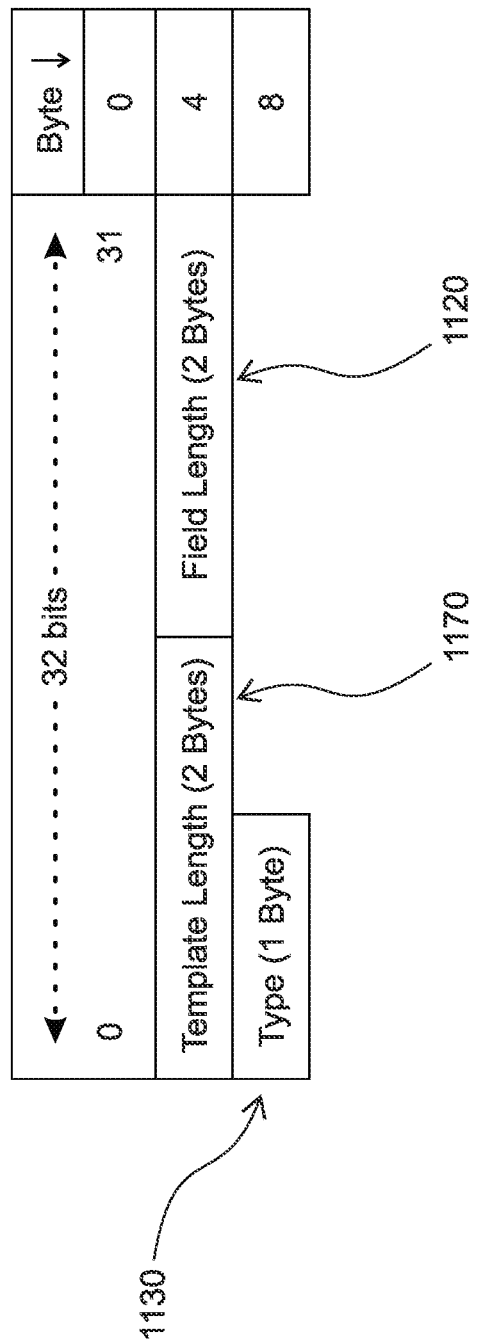
FIG. 11 shows a bit layout diagram description of a Structured Data Field Template Element which is part of the Structured Data Field Template in accordance with some embodiments.

The RSAS header may further comprise bytes associated with a Field ID 300 as shown in FIG. 11. The Field ID includes a reference to the identification of the data field associated with a given Structured Data Field Template. The Field ID may, for example, specify a Field Length 1120 which represents the normal length of that structured data field in Bytes and/or a Field Type 1130 which dictates the class or type of that structured data field. The Field ID may also contain the Structured Data Field Template Length 1170.

In some embodiments, an RSAS-formatted physical or logical storage unit may optionally comprise statically or dynamically defined memory locations for the structured data portions of a record in the dataset. Such data could be stored in byte sequence as defined in the header without separators or definition. An RSAS may define an optional hash verification for the record, and/or the structured data portion of the record and/or the semi-structured portion of the record. That check could be used as an integrity check for the record.

Figure 12:
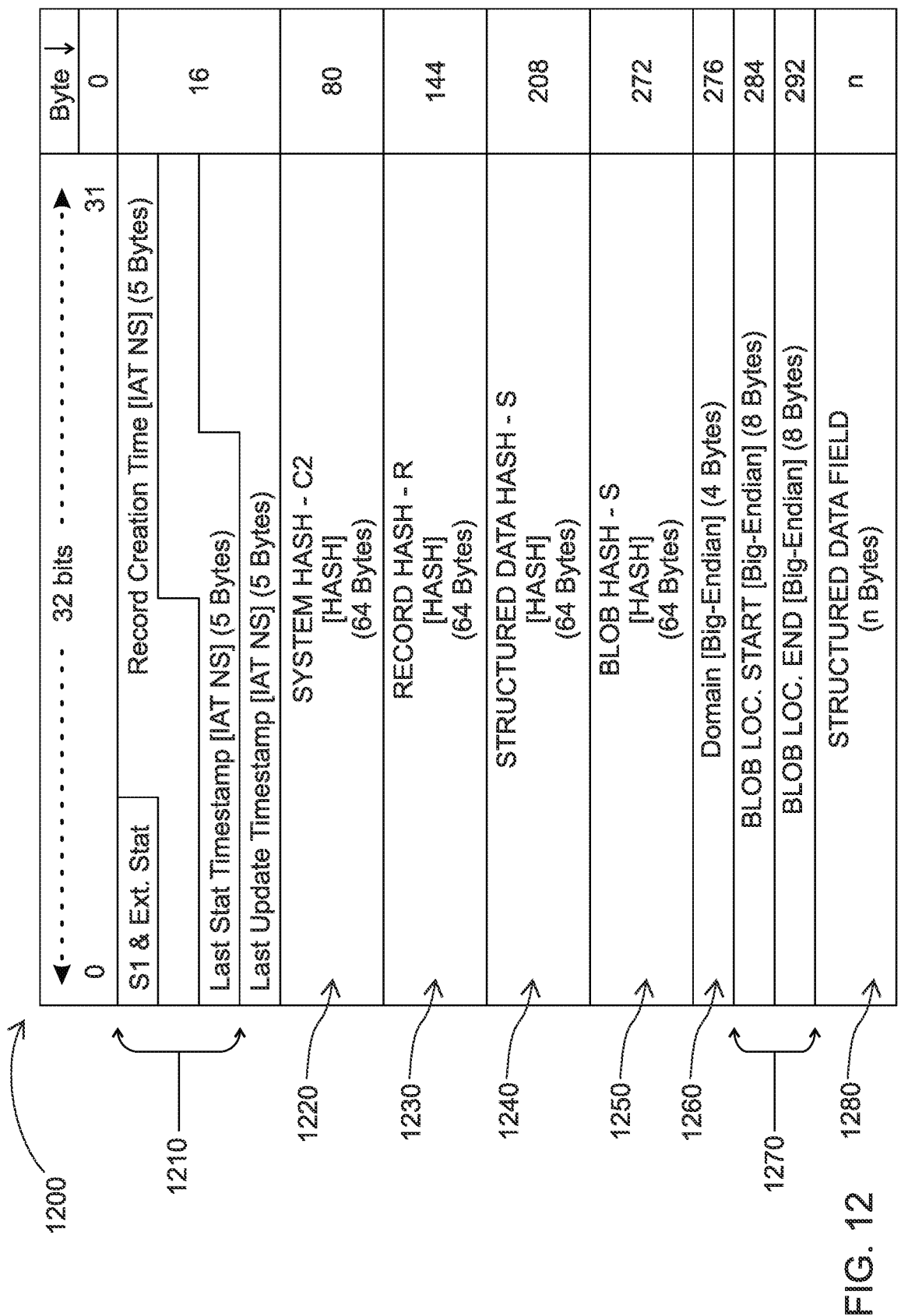
FIG. 12 shows a bit layout diagram description of the Structured Data fields of a record in accordance with some embodiments.

As shown in the preferred embodiment 1200 of FIG. 12, the storage of the structured data component of a record may be specifically defined by the following fields, for example in combination with the fields defined in the header.

A Record Status Field 1210 which gives both the basic status of the record and/or its extended status. Record Status Field information may include, but is not limited to, Active or Deleted; a Record Creation Timestamp most commonly in a form of time index since a known date; a Last Status Changed Timestamp most commonly in a form of time index since a known date; and a last updated timestamp most commonly in a form of time index since a known date;

A Last System Status Hash 1220;

A record hash of the whole record 1230;

A structured data hash of the values of the structured data portion 1240, which may include the record creation date;

A semi-structured data hash of the body of the semi-structured data portion of the record 1250;

A domain reference for the record 1260;

A reference to the semi-structured data location portion of the record on the storage unit; and/or A reference to the total number of bytes or ending location of the semi-structured data portion of the record 1270.

In some embodiments, an RSAS-formatted physical or logical storage unit may optionally comprise statically or dynamically defined memory locations for the semi-structured data portions of a record in the dataset 1280. The precise location of each semi-structured data portion of a record should be defined by the fields of the structured data portions of the same record.

CLUSTERING OF RSAS-FORMATTED STORAGE FOR STORING AND QUERYING LARGE-SCALE DATASETS—Data collection and telemetry systems which produce trillions of records in mixed structural formats present a challenge in terms of storing and querying the data. Storage formats such as the RSAS described above increase the performance of a single storage unit with such large-scale datasets. However, they may not directly address the resiliency and availability of the stored data.

Using an RSAS Cluster Controller (RCC) to control a local or distributed cluster of RSAS-formatted storage media and their associated operating systems solves that problem. An RCC can replicate the data, maintain a synchronized state across all storage media and distribute queries among RSAS-formatted storage within the cluster. In that manner, an RCC can maintain a high level of system performance through resiliency and availability while shielding the core data analytics system from the pitfalls of other systems with rigid standardized fragmentable file formats and applications running on various platforms or operating systems.

A RSAS Cluster Controller (RCC) maintains resilience and integrity of the stored records in a cluster of RSAS-formatted storage. In preferred embodiments, the RCC achieves that by replicating new data to all RSAS-formatted storage in the cluster using verification feedback with each storage participant. The integrity states among the storage units are maintained by the RCC through the use of chained transaction signatures. RCC can then bring any storage participant whose state is out of sync back to the correct state, either incrementally (repair) or through full replication (replacement).

In some embodiments, query performance may further be enhanced by utilizing an RCC to distribute queries between RSAS-formatted storage media in the cluster. Such a distribution ensures the parallel processing of queries with overlapping execution processing. Using that method, the read request blocking and/or queuing inherent to queries attempting to access the same physical storage medium simultaneously is avoided, until the number of parallel queries exceeds the number of storage systems in the cluster. Performance may be further optionally enhanced by the RCC performing processing of the data records meeting the queries filters upon retrieval from storage. In some embodiments, that processing may take the form of producing data structures matching the requested aggregation and/or metrics of a query, which are returned to the requestor.

The use of an RCC provides a method for both performant handling of multiple queries, and for ensuring the integrity and availability of the records in a large-scale dataset. As a method of clustering RSAS-formatted storage, an RCC is intentionally designed to bring durability in performance, accessibility, and integrity of hyperscale data-based applications which fully consume a given RSAS-formatted storage resource.

Figure 13:
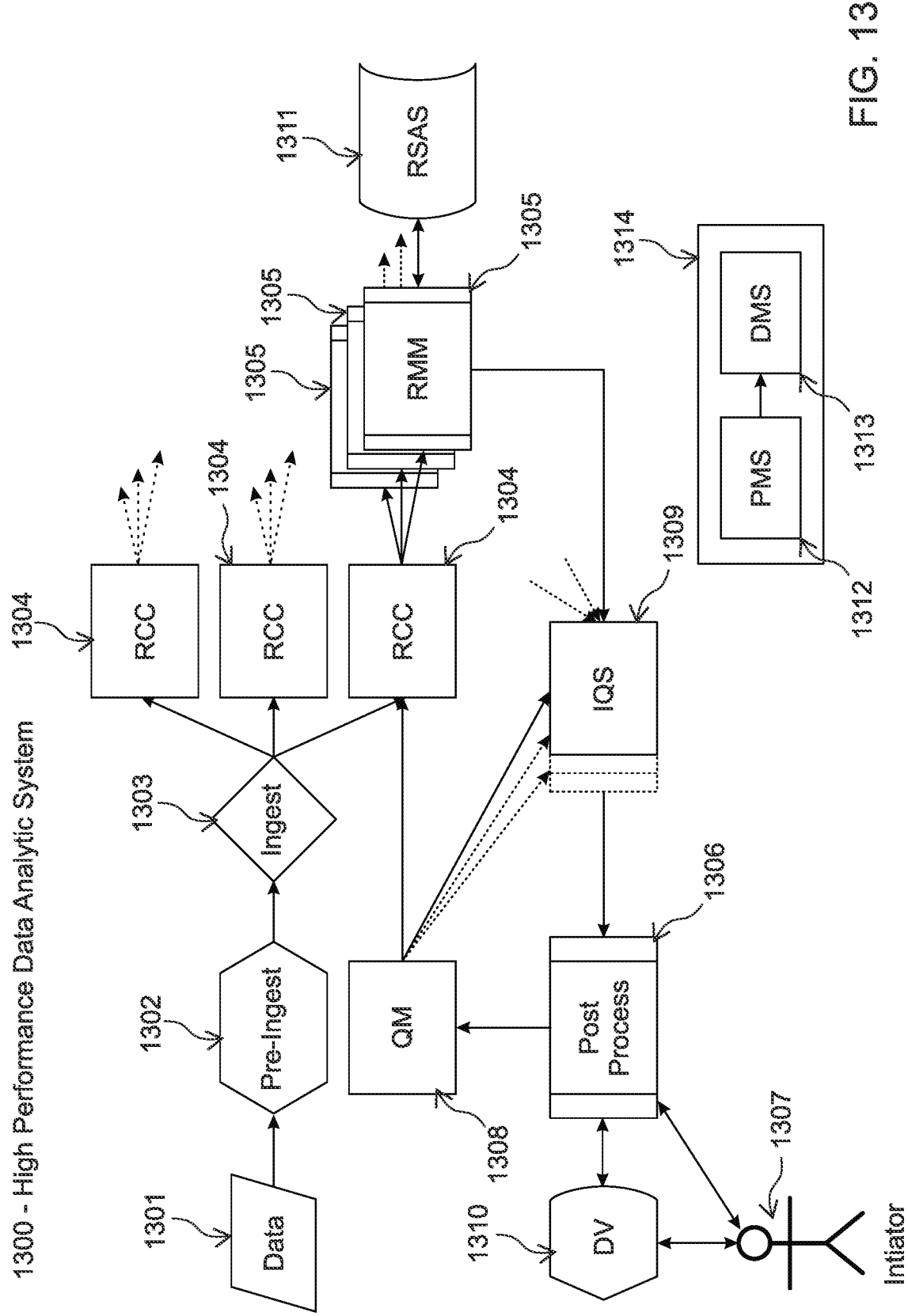
FIG. 13 illustrates a High Performance Data Analytics system in accordance with some embodiments.

In the embodiment shown in FIG. 13, the hyperscale data system comprises a combination of functions which share common code management and methodology to form a whole system in a "distributed data pipeline." That architectural method of breaking functions into distinct functions allows the system to grow as needed effectively and to be deployed and managed easily. While they are referenced as independent systems connected by a computer network for the purpose of illustration, a person of ordinary skill in the art will readily understand that the processes and functions may or may not in part or whole be located in the same physical hardware, or even the same executable code.

Figure 18:
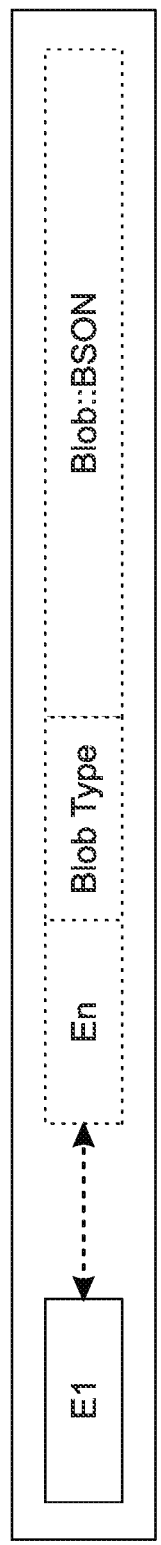
FIG. 18 illustrates aspects of data record storage in accordance with some embodiments.

FIG. 13 illustrates that as data 1301 enters into the Pre-Ingest 1302 process it is prepared for use with the rest of the hyperscale data system. The primary use of the Pre-Ingest processes is to translate the communication protocol used by the data source to one that is used by the HD Core systems 1300. For example, the Pre-Ingest process might convert JSON delivered over HTTP/2 using UCP/IP on 100 Gigabit Ethernet which might by the data source to ProtoBuf over gRPC on 200 Gigabit InfiniBand HDR which might be used in the hyperscale data system as a data record (see FIG. 18).

In some embodiments, the Pre-Ingest process may also manipulate or perform work on the data. An example of data manipulation might be the mutilation of a data record to include additional data, removal of data elements, or changing the values of data elements. An example of work performed on data could include additional stream processing through a query engine, AI or ML application which produces additional metadata on some, part, all, or a segment of the data handled by a Pre-Ingest process. Additionally, the Pre-Ingest process may add a Namespace identification to the data record. If allowed by the datasource or through other means such as a load balancer there may be multiple Pre-Ingest processes running at the same time to meet the needs of the overall application. Each Pre-Ingest process may or may not be providing identical functionality. While a Pre-Ingest process may forward to multiple Ingest 1303 processes to which it and or other Pre-Ingest processes are forwarding data records to, the Pre-Ingest process should only forward an individual data record to only one Ingest process.

The main function of an Ingest node is to determine to which RSAS Cluster Controller (RCC) 1304 a data record should be forwarded. That could be determined by a user definable algorithm such as round robin, time based, or based on value or range of values of one or more elements of the data record. The Ingest process may branch or loop the data records through additional processing such as AI or ML which may produce data which is either independently routed to an external system, added to the data record(s), used to modify the data record(s), or replace the data record(s). The Ingest process may add an element to the data record as a super index identifying the group to which that data record was routed. The Ingest process also calculates a cryptographic hash of the data record, which it may add to the data record as an additional element or otherwise reference to the data record. The data record, including hash, is then forwarded to the selected RCC by the Ingest process.

Figure 15:
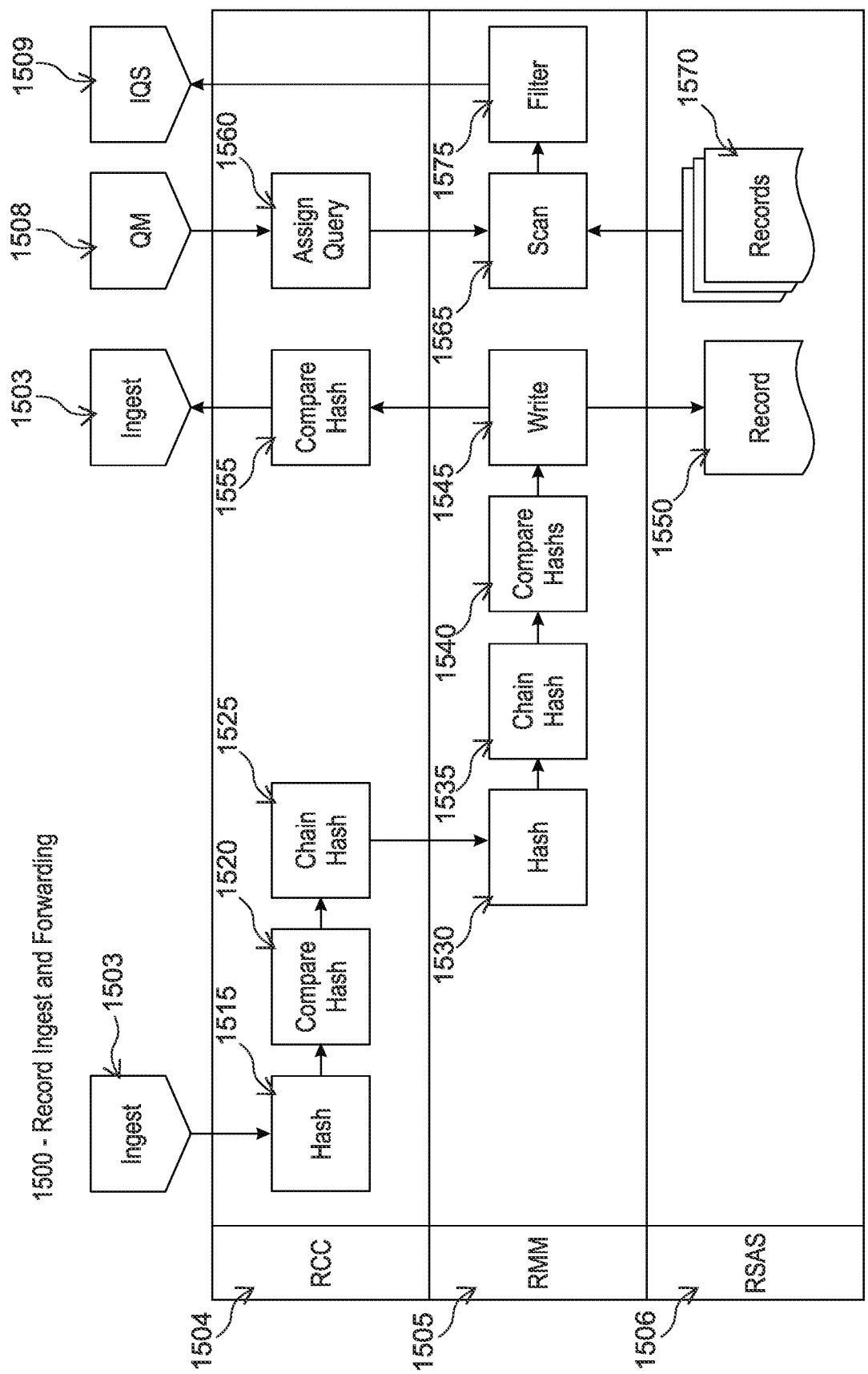
FIG. 15 illustrates aspects of data authentication in accordance with some embodiments.
Figure 16:
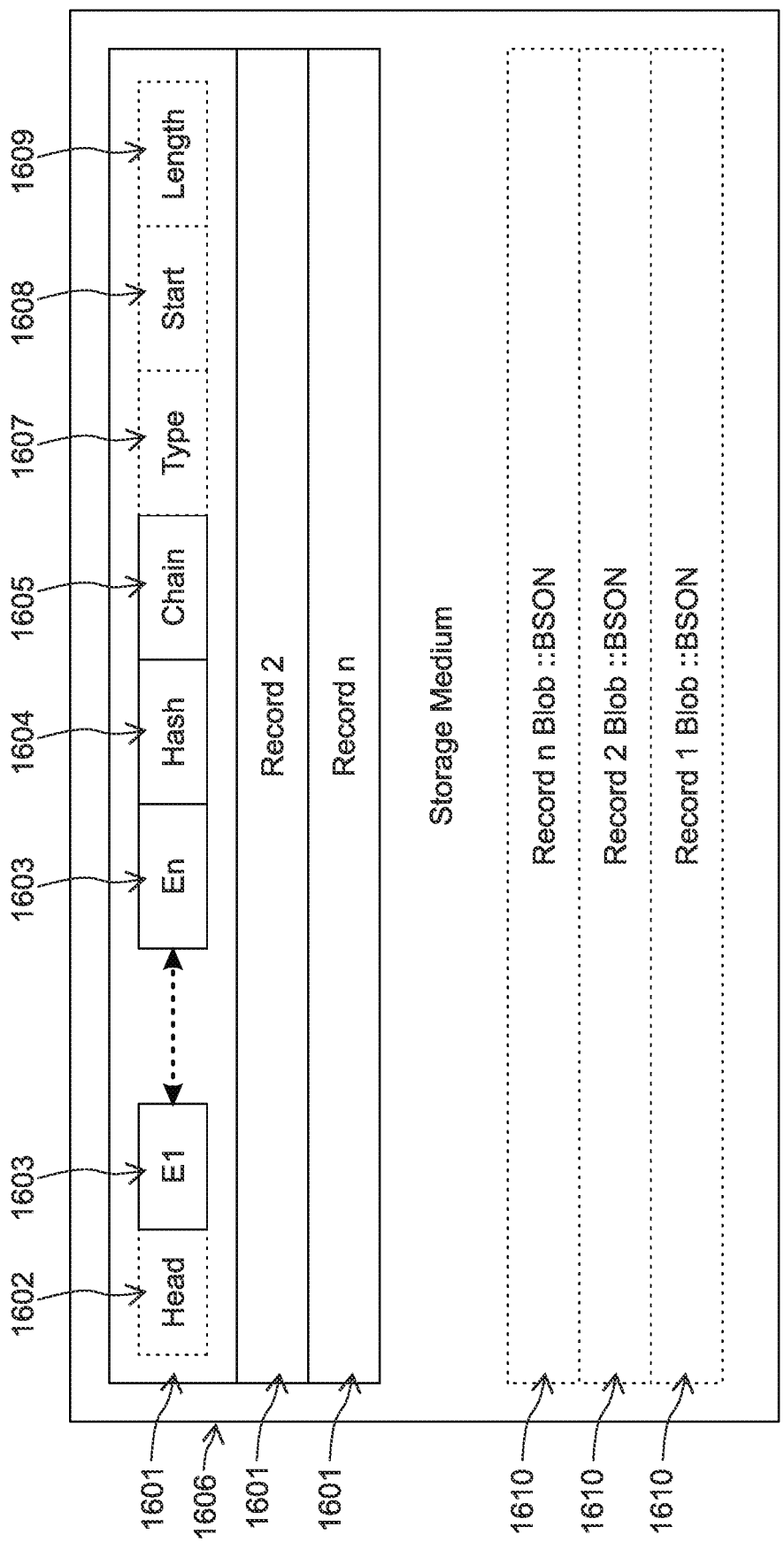
FIG. 16 illustrates aspects of RSAS storage performance in accordance with some embodiments.

Referring to FIG. 15, the primary function of the RCC 1504 is to forward data records to all RSAS Media Managers (RMMs) 1505 that it controls. It accomplishes that by first calculating a crypto hash 1515 on the data record without the hash calculated by the Ingest 1503 process. The RCC then compares its hash with that of the one calculated by the Ingest process 1520. If the two hashes do not match the RCC will drop processing the data record, issue an error for the record, and may request or receive a new copy of the data record from the Ingest process.

The RCC next calculates a crypto hash called the chain hash 1525. It does that by calculating a crypto hash using the hash of the data record with that of the last calculated chain hash. The RCC may keep a copy of the hashes in persistent storage. The chain hash may be added to the data record as an additional element or otherwise reference to the data record by the RCC. The RCC also has the function of distributing query requests to an RMM for fulfillment. That may be done using an algorithm such as round robin. In some preferred embodiments, the RCC also keeps an index of namespaces and superindexes even if they are added by another process.

The RMM 1505 embodies the function of storing and reading data records to and from persistent storage, respectively. When new data records arrive at an RMM, it initially calculates a crypto hash 1530 on the data record without reference to the hashes calculated by the Ingest process or the RCC 1504 process. As with the RCC described above, the RMM also calculates a crypto hash called the chain hash 1535 by calculating a crypto hash using the hash of the data record with that of the last calculated chain hash. The RMM compares the hashes it has calculated with those provided by the RCC 1540.

In the case the hashes do not match the record is dropped and an error is generated which should be logged, and may result in a notification to the RCC 1555. If the hash for the data record does not match, the RMM may request or be sent a new copy of the data record from the RCC. If the hash for the data record matches but the chain hash does not, the RCC may audit the chain history of the RMM and require the RMM to overwrite all data records with a non-matching chain hash from another RMM. If both hashes match the RMM will write 1545 the data record 1550 to an RSAS-formatted persistent storage medium 1311 of FIG. 13.

In some embodiments, the RMM 1505 may optionally keep an index of namespaces and superindexes even if they are added by another process. After writing, the RMM will notify the RCC 1504 by sending it both calculated hashes. The RCC will then compare the hashes to the ones it created 1555. If either hash does not match the RCC may audit the chain history of the RMM and require the RMM to overwrite all data records with a non-matching chain hash from another RMM.

In some preferred embodiments, data is retrieved from persistent storage by way of query. Referring back to FIG. 13, initiator 1307 such as a user or automated process may start the process with a call through the Data Visualization Engine (DV) 1310 or through a Post Process 1306 function. The post process function will properly format the query and pass it to the query manager (QM) 1308. The QM compiles the query into distinct steps of, raw data record filter, formula and filter, formula and filter and branch. The QM sends the raw data record filter to the RCCs 1304. The QM also sends all other steps to the IQS 1309 processes. IQS processes include breaking the querying process into a distributed system analogous to a microservices architecture, wherein each function is a distributed single task process. In that manner, a single storage system can process data in many different ways. The IQS includes the capability to morph, fork, and process data in the stream at various IQS nodes. The IQS may be applicable, for example, to super aggregation and analytics such as p95 by an hour or distributed AI processing.

An RMM 1305 which has received a raw data record filter query step from a RCC streams matching records into the IQS. As data is compiled through the IQS it is streamed to the originating Post Process function. This function may execute one or more of several steps including but not limited to continued processing of the data, forwarding the data to another function in the Post Process process, exporting of the data records to an external system, or sending the data to the Data Visualization Engine.

The formula function of a step is a user-defined function such as batch aggregation (Sum, Minimum, Maximum, Average, . . . ), or more complex functions such as adding a virtual element based on a formula using the one or more elements of a data record as its put. A branch function sends a copy of the resulting data record to a secondary independent function after the formula and filter functions in the step.

Figure 14:
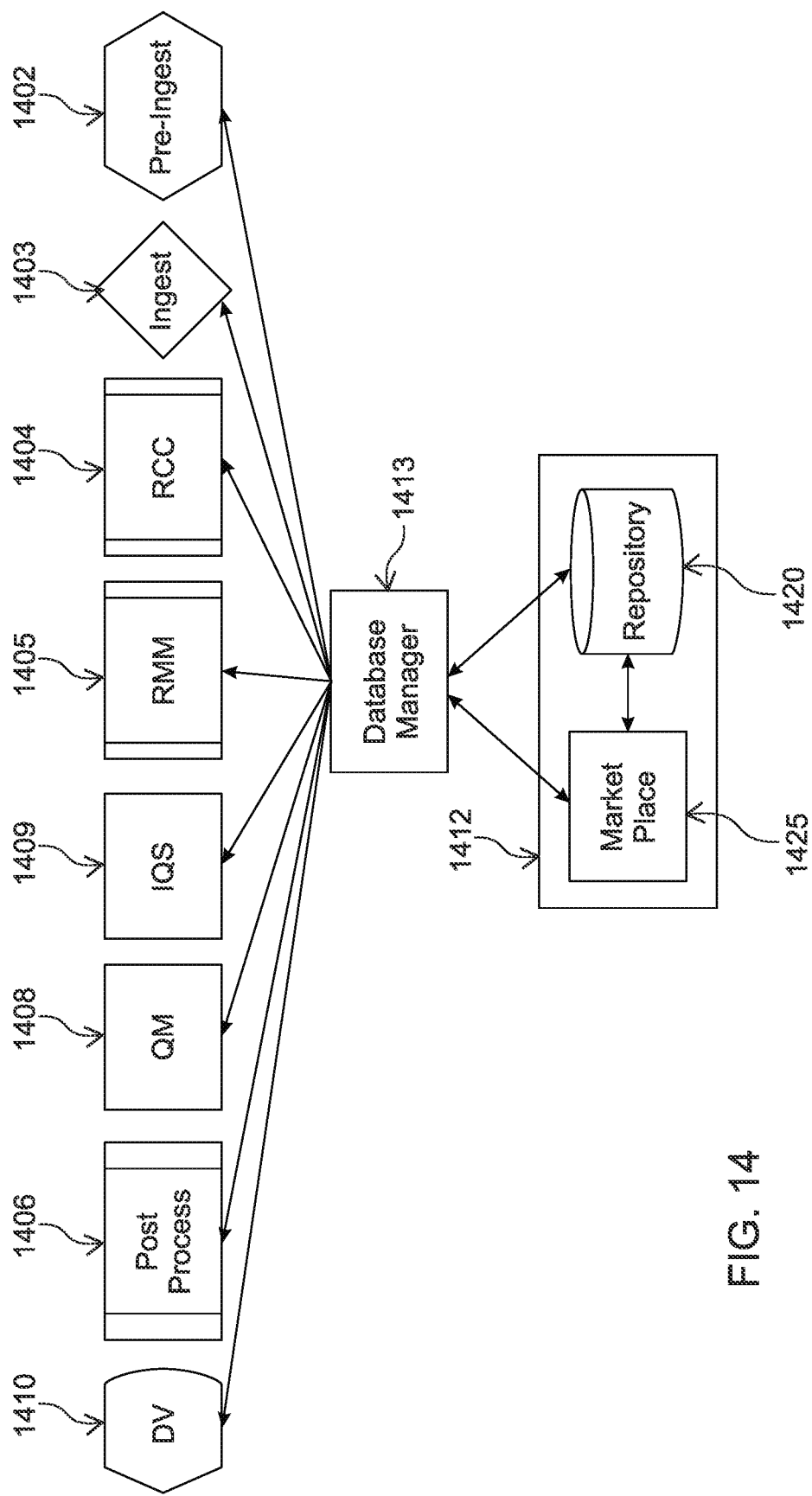
FIG. 14 illustrates aspects of an RSAS Database Management and Deployment System (RD2S) in accordance with some embodiments.

FIG. 14 illustrates aspects of an RSAS Database Management and Deployment System (RD2S). To tie all of the foregoing processes together and coordinate them as whole, a Database Management System (DMS) 1413 is used. At its core, the DMS is used to receive packages (FIG. 19) and deploy configuration modules from those packages to each process in the system. Within a public or private package management system (PMS) 1412, packages and their components are stored in package repositories 1420. A marketplace 1425 provides a directory to the operator's packages, third party public repositories, and commercial repositories. The marketplace may provide a means for operators to purchase packages (see FIG. 19) to use. Packages used by a DMS may contain a complete set of configuration files and other supporting files for all or some of the processes in the hyperscale data system.

Figure 19:
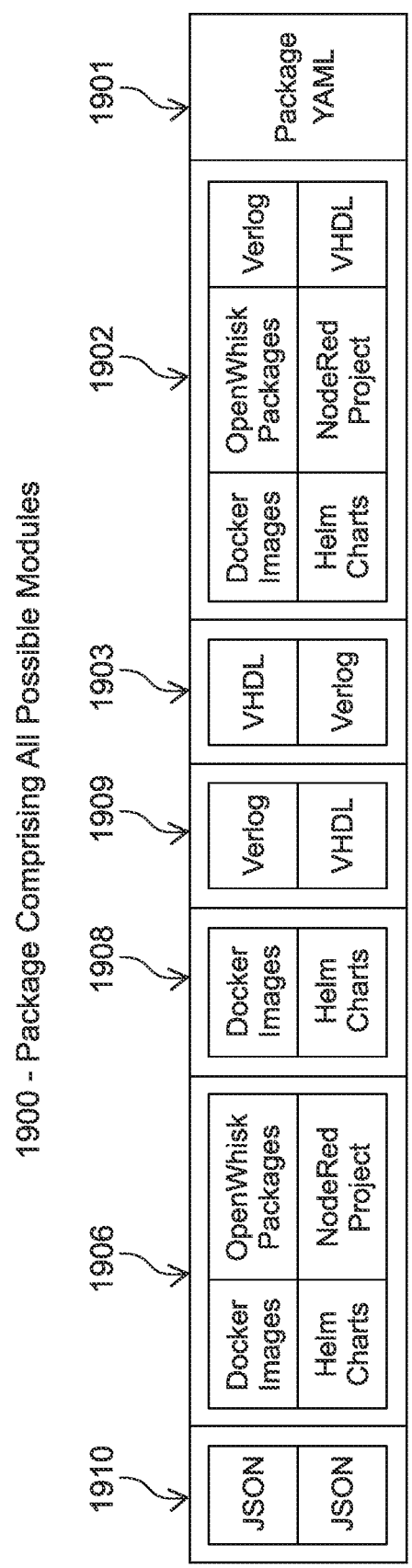
FIG. 19 illustrates aspects of an embodiment comprising a package which contains various modules and some of the options for configuration files which they may contain; some preferred embodiments do not contain all modules shown.

For illustration purposes, FIG. 19 depicts an embodiment comprising a package which contains several modules and some of the options for configuration files which they may contain. Not all packages require all of the modules shown, and a module in turn may contain multiple configurations if the process to which it is being deployed supports more than one configuration. Referring also to FIG. 13, supported defined modules include a module 1901 for the Data Visualization Engine 1310, a module 1902 for the Post Process 1306, a module 1903 for the QM 1308, a module 1904 for the IQS 1309, a module 1905 for the Ingest 1303, a module 1906 for the Pre-Ingest 1302. A package also includes a metadata file called package.yaml 1907 at its root. This file provides information about the package and how it should be deployed in reference to the hyperscale data system. Together packages (FIG. 19), a PMS 1312, and a DMS 1313 comprise the operational component called a RSAS Database Repository and Deployment System 1314, RD2S, as shown in FIG. 14.

MULTI-DIMENSIONAL SCALING QUERY ENGINE—Modern database query engines tend to exhibit monolithic architectures in which a single entity executes a single process on a single set of compute resources. Much as crafted product production is scaled up by adding additional craftsmen, performance is driven by using parallelization processes in which each query engine works on a chunk of data.

To understand the effects a query engine has on performance it is important to first understand the nature of the data on which it is operating. Hyperscale datasets are not only large, but by their very nature tend to be uncapped data streams with no defined upper limit. As a result, the structures of the datasets are isomorphic and the individual data records are immutable, sometimes referred to as Write Once Read Many (WORM) data. State changes in data record are recorded to the stream as a new record. In some cases, a process called tombstoning is used to mark no longer valid data records, but as immutable data records they are never updated or removed individually. Consequently, all Hyperscale datasets have a temporal super index. That cornerstone of the RSAS format structure allows it to support single direction read from storage media.

The uncapped nature of the streaming datasets dictates that storage and long-term validity may inevitably become issues as well. The most common method of dealing with that issue to use a process to "age out" obsolete or unwanted data. Typically, data older than some period of time, which in some embodiments may be a predetermined data retention period, is removed from storage or allowed to be overwritten. In some embodiments, the purging of data may be performed at predetermined data purge intervals.

Most query engines employ the scale out approach of query management. In that scheme, a super and or primary index is used to generate some number of copies of the query, where each query has been modified to filter to only a small section of the original queries selected super and or primary index range, thereby allowing for parallelization of the original query. Those queries are then sent to child databases that process the queries one at a time, returning the result to the master query engine, which in turn recombines them into a single results dataset. That architecture works by ensuring a smaller results dataset is produced by individual systems for each query segment, preventing issues common to limited resources as the query is executed, and by allowing for more than one query process to run simultaneously. While no one process runs any faster, the legacy scale out query management approach can operate to reduce overall query processing time.

In some preferred embodiments with features similar to those shown in FIG. 13, the interrupted querying system, IQS 1309, takes a different and novel approach to a query engine. Rather than breaking a query up by the super or primary index and distributing the resulting queries to secondary query engines, the IQS's Query Manager, QM 1308, directly compiles the query into its component steps. More specifically those components may include a raw data record filter, and a series of binary math formula and filter steps which may include a final branching secondary function.

Figure 20:
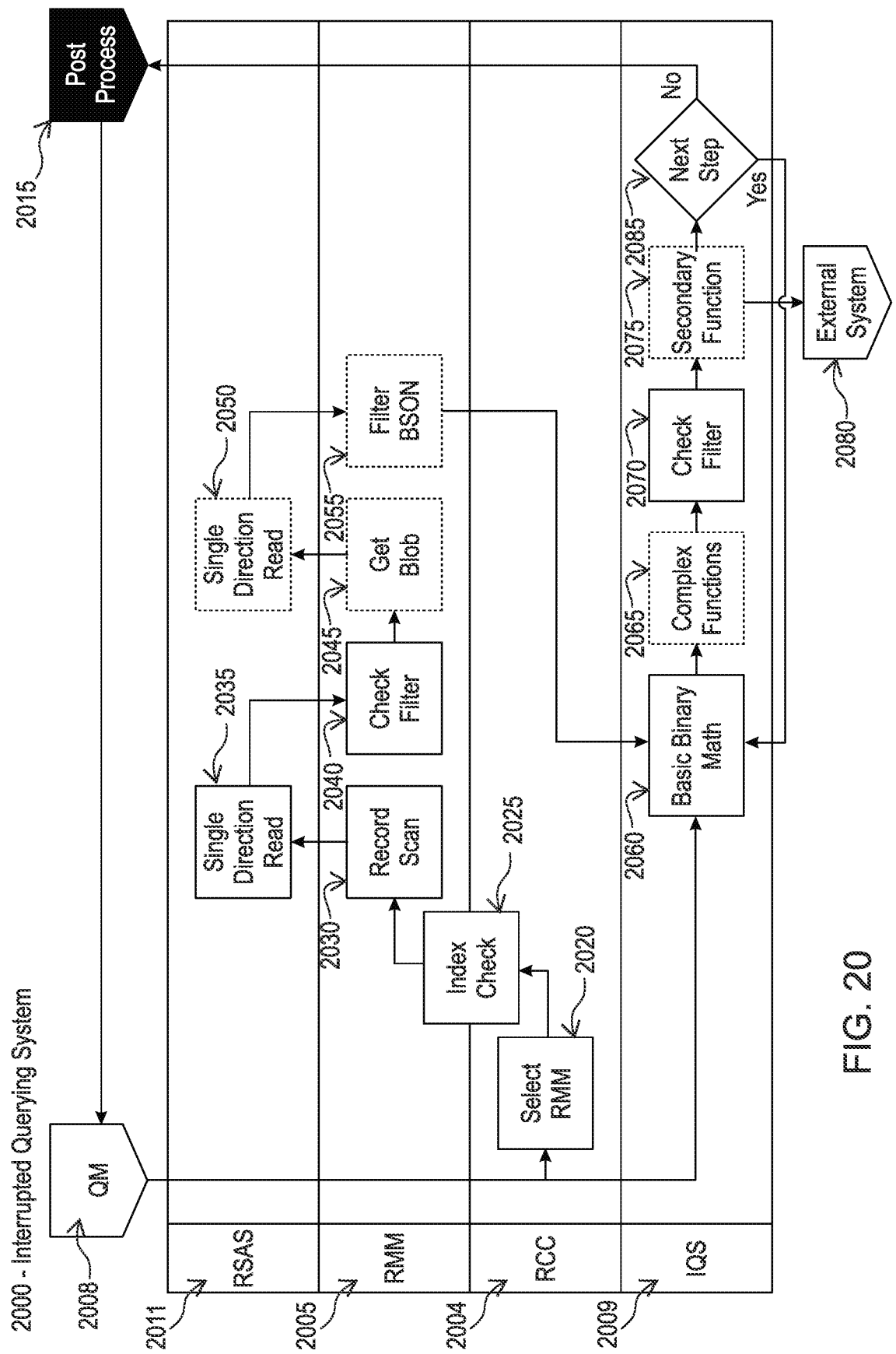
FIG. 20 illustrates aspects of a query system and method in accordance with some embodiments.
Figure 21:
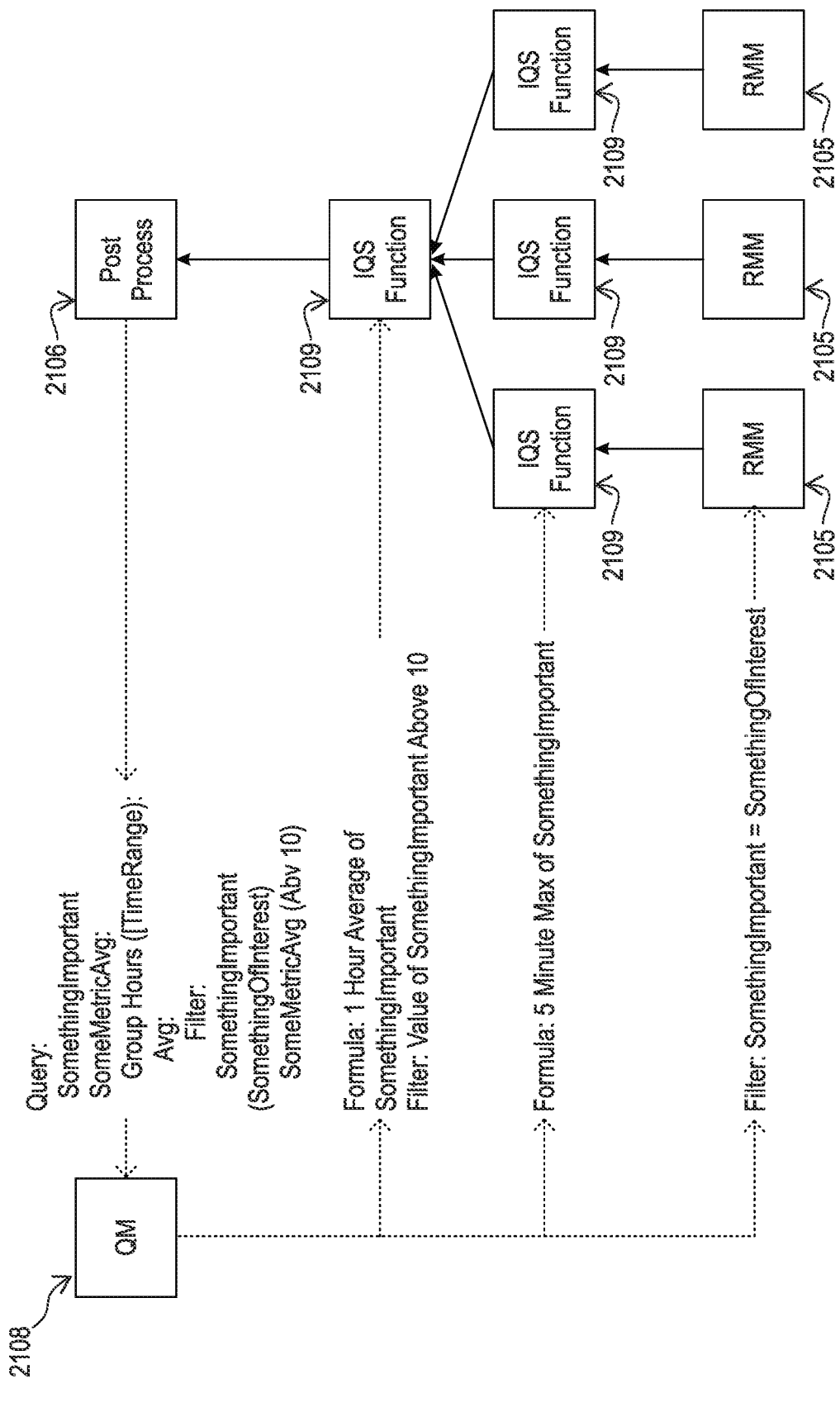
FIG. 21 illustrates further aspects of a query system and method in accordance with some embodiments.

Referring to FIG. 20, in such embodiments the raw data record filter is forwarded to the RCCs 2004 which in turn selects 2020 RMMs 2005 to process the filter. The other steps are distributed to a hierarchy of IQS processes (see FIG. 21). The QM may additionally assign a query identification for each query, which it will also pass along with each component step. If Indexing is utilized, either the RCC or the RMM may scan the Index 2025 as a WORM dataset to check for the existence of target data records within super index clusters stored in the RSAS-formatted media 2011 controlled by the RMMs.

If found the RMM 2005 will scan 2004 the RSAS formatted media 2011 connected to it for the structured portion of data records using the index as a reference, or scanning all data records for one that match the element filter(s) of the structured components. Because the structured parts of all data records have the same structure, the increment in Bytes that must be read between elements and records is always a fixed distance allowing for a scan to jump from one memory location to the next without a lookup and in a single direction.

If matching data records have an attached blob, it is retrieved 2045, 2050 and any additional binary filtering matching is applied 2055. The complete matching post-filter data record which has passed all filters is directly streamed to the IQS 2009. If a query identification was also provided for this query, that identification is also sent with the data record.

After the RMM 2005 has scanned all records in the range, it will send a complete message to the IQS along with any query identification, which may be used as an event trigger by an IQS function. The IQS is composed of a series of autonomous functions stacked in layers. The output from one or more functions in one layer is sent to the input of a function in the next layer until the data is provided to an external system 2080 or the Post Process 2015. All IQS functions in each layer receive the same query component step from the QM 2008.

A query component step contains a binary math formula and filter steps, which may include a final branching secondary function that is executed by the IQS function. If a query identification is provided data records which have been identified with the same query identification are passed to that secondary function. In this way a single system can operate more than one query at a time.

The IQS function completes this by first executing any basic non-floating-point-intensive operations 2060. If there are floating-point-intensive operations, the IQS function then executes those 2065. The resulting data record is compared to a filter 2070 and any data record which matches the filter may be passed to a secondary function 2075 which provides additional treatment to the data record(s) before sending it to an external system and or on to the next IQS function layer 2085. If no secondary function is defined, the data record is directly forwarded to the next IQS function layer.

Figure 17:
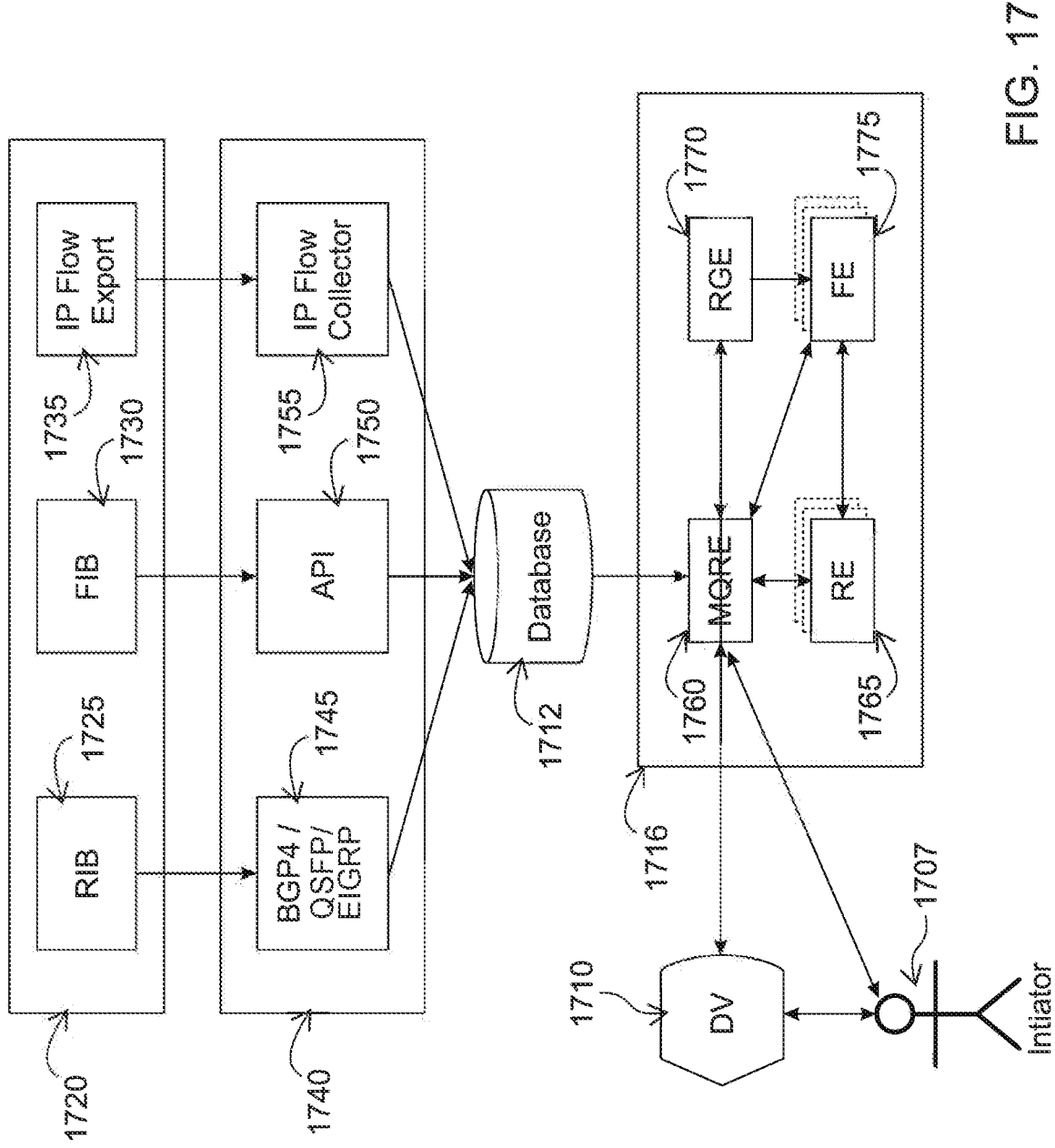
FIG. 17 illustrates aspects of query routing of in accordance with some embodiments.

DISTRIBUTED ROUTE ANALYTICS—The purpose of route analytics is to help network operators understand how routing affects traffic within their network in all three temporal windows: past, present, and future. A number of protocols and telemetry types are used including routing data, configuration data, and network flow data. Historically this has been a major challenge for the industry as modeling complex networks can be a horrendously or even prohibitively arduous task given the amount of data involved. The task has become so daunting that route analytics in general have fallen out of favor, even though there has also been a resurgence in demand for predictive analysis traffic engineering, one of the outputs of route analytics tools. With a hyperscale data system, a new type of route analytics tool can be built comprising a set of post processor 1306 functions. As shown in FIG. 17, the Post Process Functions 1716 for the post processor application are a Master Query Route Engine (MQRE) 1760, Route Engines 1765, a Route Graph Engine 1770, and Flow Engines 1775.

These functions work with data from the hyperscale data system data store 1712 which was collected from routers 1720. The data collected from routers are route advertisements 1745 such as BGP or OSPF and Network Flow such as sFlow or IPFIX 1708. Optimally an API connection to the router such as NetConf is used to collect data 1707 from the router's Forwarding Information Base 1730 as well.

When requested by an outside process such as the Data Visualization 1710 function of the hyperscale data system or via another application or user 1707, the MQRE 1760 uses the collected data to perform route analytics. Requests to the MQRE can come in one of three forms: traffic modeling where the nature of the traffic as reported by network flow records is modified, route modeling where a new route is added to the network, or both. All modeling requests to the MQRE should include a network flow query for the time and optional traffic it would like to use from the hyperscale data system's data store. In the case of traffic modeling the MQRE prepares a data transformation template to be used with the network flow data retrieved from the hyperscale data system's data store. In the case of route modeling the MQRE prepares a template of route withdraws and route injections. If there are any prepared route changes the MQRE will initiate 1 Route Engine 1765 function per physical router in the modeled network. The information about the modeled network is externally provided by the user or through automation and includes information about the routing devices and how they are physically connected to each other.

Each Route Engine 1765 is loaded with the chosen state of the router it represents. In order of preference, the chosen router state is FIB 1730 information or alternatively RIB 1725 as presented by Routing announcements 1745. Using a process the same as or similar to that of the router which a particular Route Engine represents, that particular Route Engine builds a new temporal profile of the router's FIB using the route modeling template created by the MQRE 1760. The resultant routing temporal profile is then sent back to the MQRE process.

Upon receipt of the routing temporal profiles from the Routing Engine, the MQRE 1709 provides the temporal profiles and the information about the modeled network to the Route Graph Engine 1770. Using that information, the Route Graph Engine calculates a graph of the relationships between routers over the time period being modeled. The calculated graph is returned to the MQRE for later use.

The Route Graph Engine 1770 then initiates Flow Engines 1775 for each router in the modeled network for which it has a temporal profile. The Route Graph Engine provides to each Flow Engine its relationship to its neighbors, after which it instructs all Flow Engines to initiate the traffic modeling process.

In the traffic modeling process, Flow Engines 1775 which were identified as having an exterior connection to the graph make a request to the MQRE 1709 for the data transformation template and a stream from the hyperscale data system data store using the query provided to the MQRE. Using the graph information from the Route Graph Engine 1770, the Flow Engine filters incoming network flow records from the MQRE. Network flow records which pass the filter are then processed through the data transformation template (adding, dropping, and modifying network flow records as needed).

Using the graph information from the Route Graph Engine 1770 again, the Flow Engine 1775 identifies which Flow Engine or point external to the graph to which it should forward to the network flow record. Before forwarding the network flow record, the Flow Engine appends ("tags") its own identification to the network flow record. If the forwarding destination is a point external to the graph, the network flow record is returned to the MQRE 1760.

When all of the network flow data has been fully processed by the Flow Engines 1775, the MQRE 1760 forwards the graph calculated by the Route Graph Engine 1770 and the aggregate data set of network flow records generated by the Flow Engines to the original requester, the Data Validation engine 1710 or other actor 1707. The original requestor may make additional and recursive requests to the MQRE to model additional changes including changes based on the output from the MQRE on successive requests.

METRIC BUS SYSTEM—In some embodiments, a modular system architecture may be employed in the course of data ingestion. Each module may be associated with a certain data type, such as SNMP or Flow in the case of network analytics. Each module may operate as an independent bus for delivering copies of datagrams to subscribing publishers in native format.

Some embodiments may comprise a data management and high-performance data analytics platform for hyperscale datasets with at least some of the following features:

A format for storing data records of a structured and or semi-structured dataset directly in logical or physical storage unit(s) such as volatile and/or nonvolatile memory.

(a) Where records are not grouped or encapsulated into files which are stored using a file system designed to share the memory of a physical or logical storage unit.

(b) Where a logical or physical storage unit is not used to store unrelated data and or other purposes.

Use of a predefined fixed order of grouped bits and or bytes of a physical or logical storage unit.

(a) Where the predefined fixed order of grouped bits and or bytes are located relative the storage unit at the top, bottom, and or middle (b) Where the predefined fixed order of grouped bits and or bytes identify the storage unit.

(c) Where the predefined fixed order of grouped bits and or bytes identify the dataset.

(d) Where the predefined fixed order of grouped bits and or bytes define the fixed order of grouped bits and or bytes used for storing structured data elements of each record in the dataset.

Use of a consecutive repeating fixed order of grouped bits and or bytes of a physical or logical storage unit.

(a) Where each repetition contains structured data elements from a record.

(b) Where some of the groups of bits or bytes optionally have the value of an element of the record.

(c) Where each group is directly created and or accessed by an application to which it has meaning, value, or use from the storage unit.

(d) Where each repetition may or may not contain a group of bits or bytes pointing to a memory location where additional structured or unstructured data for that record are located.

(e) Where optionally a group of bits or bytes in each repetition represent the status of the record and or gives notice of one or more bad bits or bytes in the area covered by that repetition or in the area of the physical or logical storage unit where the semi structured data portion of data records are stored.

A format for storing data on a physical or logical storage unit which implements an integrity check for the datastore, each record, and or record component.

(a) Where the integrity check provides a means of state synchronization between storage units.

(b) Where the integrity check provides a means of verify the integrity of the record and its place in the dataset.

A distributed query architecture for providing a composite dataset from stored data to a user or system.

(a) Where query components are broken down to distinct and independently operated filter or filter, aggregation or filter, aggregation, and analysis microservices.

(b) Where independent data storage devices read data records matching a filter and stream them to microservice in the distributed query architecture.

(c) Where microservices in the distributed query architecture perform discrete aggregation and or filter functions on the data records in the stream.

(d) Where one or more microservices in the distributed query architecture may stream their output(s) to another microservice in the distributed query architecture. In some embodiments, the output may assume the form of relatively small "data micro-batches" consisting for example of aggregate and/or filtered data records representing a dataset, where the data micro-batches may originate from within a distributed process prior to assembly of a composite query result. For instance, each of the integrated circuits or functional modules discussed herein may represent a node of the distributed process from which partial or preliminary data may be extracted.

(e) Where a microservice may make use of one or more artificial intelligence accelerators including but not limited to Application Specific Integrated Circuit, Flash Programmable Gate Array, Graphics Processing Unit, System on Chip, Tensor Processing Unit, Dataflow Processing Unit, Matrix Processing Engine for the purpose of training and or inference of artificial intelligence and or machine learning algorithms and or models.

A package management system to store, deploy, and manage component elements of a high-performance data analytics system.

(a) Where a package is a software archive of one or more discrete component elements used in the operation of a high-performance data analytics system.

(b) Where a package component element may be a dataset schema or instructions identifying structures, and unstructured elements in each data record of the dataset.

(c) Where a package component element may be an algorithm for preparing and or enhancing a data record.

(d) Where a package component element may be a microservice in the query process.

(e) Where a package component element may be a data processing service including but not limited to serverless functions, no or low code applications, or container image.

(f) Where a package component element may be a data vitalization definition.

(g) Where a package component element may be configuration information for all other elements in the same package.

In one or more exemplary embodiments, the functions and processes described may be implemented in hardware, software, firmware, or any combination thereof. If implemented in software, the functions may be stored on or transmitted over as one or more instructions or code on a computer-readable medium. Computer-readable media include both computer storage media and communication media including any medium that facilitates transfer of a computer program from one place to another.

Although the description provided above provides detail for the purpose of illustration based on what are currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A method, comprising providing a plurality of system modules including one or more distribution modules, one or more storage modules, one or more aggregation modules, and one or more query manager modules, wherein:

the plurality of system modules is collectively configured in a microservices architecture for storing and querying records or aggregates of records of a hyperscale dataset of aggregate size greater than one terabyte at rest; and at least the one or more distribution modules, the one or more storage modules, the one or more aggregation modules, and the one or more query manager modules are operably interconnected and configured to transmit or receive data and machine-executable instructions which, upon execution, result in the following functions:

receiving, by an at least one of the one or more distribution modules, a set of data records of a hyperscale dataset;

distributing, by the at least one of the one or more distribution modules, the set of data records to an at least one of the one or more storage modules;

managing, by the at least one of the one or more storage modules, the storage of the set of data records as non-serialized binary sequences to at least one of a plurality of communicably connected block storage devices, without serialization to a file construct;

aggregating, by the one or more aggregation modules, the set of data records into an aggregate record;

sending, by the one or more aggregation modules, the aggregate record to an at least one external target based at least in part on instructions received from an at least one of the one or more query manager modules;

receiving, by the at least one of the one or more query manager modules, an external query for select records or aggregates of records of a hyperscale dataset, and, in response to receiving the external query, breaking the external query down into machine-executable components, wherein breaking the external query down further comprises:

generating an at least one bitmask filter;

sending, to an at least one of the plurality of system modules, the at least one bitmask filter, wherein the at least one of the plurality of system modules uses the at least one bitmask filter to select records of a hyperscale dataset or aggregates thereof; and designating, by the at least one of the one or more query managers, the at least one external target to which the aggregate records should be sent, so as to create a highly efficient flow of records read from one or more block storage devices by the one or more storage modules, to the one or more aggregation modules, to the at least one external target.

2. The method of claim 1, wherein the hyperscale dataset is an append-only set of data records formatted in a standardized digital record schema.

3. The method of claim 1, further comprising designating, by at least one of the one or more distribution modules, at least one of the one or more storage modules to which to forward a received record.

4. The method of claim 3, further comprising creating, by at least one of the one or more distribution modules, a metadata record identifying the one or more storage modules to which the received record was forwarded.

5. The method of claim 3, further comprising creating, by each of the one or more distribution modules and for each of the one or more storage modules to which that distribution module forwards at least one received record, a hash chain of the received records forwarded to that storage module by that distribution module, wherein the hash chain is used for the purposes of verifying and maintaining the state of the data stored within that storage module.

6. The method of claim 1, further comprising storing, by at least one of the one or more storage modules, a received record as a non-serialized binary sequence, wherein the non-serialized binary sequence is stored directly in a sequential memory location or block of a communicatively-connected block storage device, without any serialization or file construct.

7. The method of claim 6, further comprising creating, by at least one of the one or more storage modules, a metadata record identifying the storage device and the first sequential memory location or block on the storage device where the received record was stored.

8. The method of claim 6, further comprising creating, by at least one of the one or more storage modules, a hash chain of the forwarded records it has received and returning the hash chain to the plurality of distribution modules from which the forwarded record was received, for the purposes of verifying and maintaining the state of the data stored by the storage module.

9. The method of claim 3, further comprising executing, by an at last one of the one or more query manager modules, the external query using a distributed process, wherein executing the external query does not comprise dividing the query into a plurality of smaller independent and at most loosely-coordinated shard queries.

10. The method of claim 9, further comprising creating, by at least one of the one or more query manager modules, a distributed process by breaking the external query into a plurality of machine-executable components including:
a filtering component comprising a record filter in the form of a bitmask filter to be used to select a record and to designate a target to which the selected record is to be sent, wherein the target comprises at least one of the one or more distribution module or one or more of the at least one storage modules, and
an aggregating component comprising an aggregate record filter in the form of a bitmask filter to be used to select an aggregate record, and to designate the at least one external target to which the selected aggregate record is to be sent.

11. The method of claim 1, further comprising designating, by at least one of the one or more distribution modules and in response to receiving a machine-executable component of the external query, at least one of the one or more storage modules to which to forward the at least one machine-executable component.

12. The method of claim 1, further comprising reading, by at least one of the one or more storage modules and in response to receiving a machine-executable component of the external query, memory locations or blocks of the indicated block storage device sequentially using the at least one bitmask filter to select records to be sent to the at least one external target based on the metadata record.

13. The method of claim 1, further comprising creating, by at least one of the one or more aggregation modules and in response to receiving a machine-executable component of the external query and records of a hyperscale dataset, an aggregate record, and, using the at least one bitmask filter, selecting an at least one aggregate record to forward to the at least one external target.

14. The method of claim 13, further comprising forwarding, but at least one of the one or more aggregation modules, the at least one aggregate record, wherein the at least one aggregate record is forwarded in a common in-memory columnar format to the at least one external target using remote direct memory access (RDMA).

15. The method of claim 10, wherein the at least one external target comprises an external worker instance of a distributed process.

16. The method of claim 10, further comprising providing an external data processor communicatively connected to the system, wherein the external data processor provides a final aggregation of records, or of aggregate records, selected by a query, into a single result set, and wherein the external data processor is designated as a target in a machine-executable component of the external query.

17. A system, comprising a plurality of system modules including one or more distribution modules, one or more storage modules, one or more aggregation modules, and one or more query manager modules, wherein the plurality of system modules is collectively configured in a microservices architecture for storing and querying records or aggregates of records of a hyperscale dataset of aggregate size greater than one terabyte at rest, and wherein:
at least the one or more distribution modules, the one or more storage modules, the one or more aggregation modules, and the one or more query manager modules are operably interconnected and configured to transmit or receive data and machine-executable instructions;
the one or more distribution modules are configured to receive a set of data records of a hyperscale dataset, and to distribute the set of data records to at least one of the one or more storage modules;
the one or more storage modules are configured to manage the storage of data records of a hyperscale dataset as non-serialized binary sequences to at least one of a plurality of communicably connected block storage devices, without serialization to a file construct;
the one or more aggregation modules are configured to aggregate a set of data records into an aggregate record, and to send the aggregate record to an at least one external target based at least in part on instructions received from at least one of the one or more query manager modules;
the one or more query manager modules are configured to receive an external query for select records or aggregates of records of a hyperscale dataset, and, in response to receiving the external query, generate or execute machine-readable instructions to break the external query down into machine-executable components, wherein breaking the external query down further comprises:
generating an at least one bitmask filter, wherein the at least one bitmask filter is sent to an at least one of the plurality of system modules, and wherein the at least one of the plurality of system modules is configured to use the at least one bitmask to select records or aggregates of records of a hyperscale dataset;
managing record aggregation; and
designating the at least one external target to which the aggregate record should be sent,
so as to create a highly efficient flow of records read from one or more block storage devices by the one or more storage modules, to the one or more aggregation modules, to the at least one external target.

18. The system of claim 17, wherein the hyperscale dataset is an append-only set of data records formatted in a standardized digital record schema.

19. The system of claim 17, wherein the system is designed to be scaled to accommodate a larger hyperscale dataset or a higher volume of data by providing one or more additional system modules.

20. The system of claim 19, wherein the one or more distribution modules are further configured to designate at least one of the one or more storage modules to which to forward a received record.

21. The system of claim 20, wherein the one or more distribution modules are further configured to create a metadata record identifying the one or more storage modules to which the received record was forwarded.

22. The system of claim 20, wherein each of the one or more distribution modules is further configured, for each of the one or more storage modules to which it forwards at least one received record, to create a hash chain of the received records forwarded to that storage module by that distribution module, wherein the hash chain is used for the purposes of verifying and maintaining the state of the data stored within that storage module.

23. The system of claim 19, wherein the one or more storage modules are further configured to store a received record as a non-serialized binary sequence, and wherein the non-serialized binary sequence is stored directly in a sequential memory location or block of a communicatively-connected block storage device, without any serialization or file construct.

24. The system of claim 23, wherein the one or more storage modules are further configured to create a metadata record identifying the storage device and the first sequential memory location or block on the storage device where the received record was stored.

25. The system of claim 23, wherein the one or more storage modules are further configured to create a hash chain of the forwarded records it has received, and to return the hash chain to the plurality of distribution modules from which the forwarded record was received, for the purposes of verifying and maintaining the state of the data stored by the storage module.

26. The system of claim 20, wherein the one or more query manager modules are further configured to execute the external query using a distributed process, and wherein executing the external query does not comprise dividing the query into a plurality of smaller independent and at most loosely-coordinated shard queries.

27. The system of claim 26, wherein the one or more query manager modules are further configured to create a distributed process by breaking the external query into a plurality of machine-executable components including:
   a filtering component comprising a record filter in the form of a bitmask filter to be used to select a record and to designate a target to which the selected record is to be sent, wherein the target comprises at least one of the one or more distribution module or one or more of the at least one storage modules, and
   an aggregating component comprising an aggregate record filter in the form of a bitmask filter to be used to select an aggregate record, and to designate a target to which the selected aggregate record is to be sent.

28. The system of claim 19, wherein the one or more distribution modules are further configured to, in response to receiving a machine-executable component of the external query, designate at least one of the one or more storage modules to which to forward the at least one machine-executable component.

29. The system of claim 24, wherein the one or more storage modules are further configured to, in response to receiving a machine-executable component of the external query:
   read the metadata record identifying the storage device and the first sequential memory location or block on the storage device where the received record was stored;
   read memory locations or blocks of the identified block storage device sequentially; and
   use the at least one bitmask filter of the machine-executable component to select records to be sent to the at least one external target based on the metadata record.

30. The system of claim 19, wherein the one or more aggregation modules are further configured to, in response to receiving a machine-executable component of the external query and records of a hyperscale dataset, create an aggregate record, and to select an at least one aggregate record to forward to the at least one external target.

31. The system of claim 30, wherein the one or more aggregation modules are further configured to forward the at least one aggregate record in a common in-memory columnar format to the at least one external target using remote direct memory access (RDMA).

32. The system of claim 27, wherein the at least one external target comprises an external worker instance of a distributed process.

33. The system of claim 27, further configured to be communicatively connected to an external data processor, wherein the external data processor is configured to provide a final aggregation of records, or of aggregate records, selected by a query, into a single result set, and wherein the external data processor is designated as a target in a machine-executable component of the external query.

* * * * *